US009596314B1

(12) United States Patent
Eldawy

(10) Patent No.: US 9,596,314 B1
(45) Date of Patent: *Mar. 14, 2017

(54) ORDERING OF DIGITAL CONTENT BASED ON A CONTENT MODEL

(71) Applicant: Google Inc., Mountain View, CA (US)

(72) Inventor: Mohamed S. Eldawy, Mountain View, CA (US)

(73) Assignee: GOOGLE INC., Mountain View, CA (US)

( * ) Notice: Subject to any disclaimer, the term of this patent is extended or adjusted under 35 U.S.C. 154(b) by 279 days.

This patent is subject to a terminal disclaimer.

(21) Appl. No.: 13/629,051

(22) Filed: Sep. 27, 2012

(51) Int. Cl.
*G06F 15/16* (2006.01)
*H04L 29/08* (2006.01)
*H04L 29/06* (2006.01)

(52) U.S. Cl.
CPC .......... *H04L 67/2847* (2013.01); *H04L 67/02* (2013.01); *H04L 65/60* (2013.01); *H04L 67/10* (2013.01)

(58) Field of Classification Search
CPC ......... H04L 12/00; H04L 29/06; H04L 65/00; H04L 65/604; H04L 65/608; H04L 29/0881; H04L 65/60; H04L 67/02; H04L 67/10; H04L 67/1085; H04L 67/2847; G06N 7/005; G06N 99/005
USPC ................................................ 709/219, 231
See application file for complete search history.

(56) References Cited

U.S. PATENT DOCUMENTS

| | | | |
|---|---|---|---|
| 7,678,984 B1* | 3/2010 | Lamere | 84/615 |
| 8,250,009 B1* | 8/2012 | Breckenridge | G06N 99/005 706/12 |
| 8,538,686 B2* | 9/2013 | Gruen et al. | 701/426 |
| 8,655,819 B1* | 2/2014 | Burkard et al. | 706/45 |
| 2007/0255844 A1* | 11/2007 | Shen et al. | 709/231 |
| 2010/0332567 A1 | 12/2010 | Samadani | |
| 2012/0271805 A1* | 10/2012 | Holenstein et al. | 707/706 |
| 2013/0226837 A1* | 8/2013 | Lymberopoulos et al. | 706/12 |

OTHER PUBLICATIONS

Jakub Snopek, Ivan Jelinek, "Web Access Predictive Models", International Conference on Computer Systems and Technologies—CompSysTech 2005.*
Rosset, Saharon. "Model Selection via the AUC." Appears in Proceedings of the 21st International Conference on MAchine LEarning, Banff, Canada, 2004. Copyright 2004, IBM Corporation. pp. 1-8.*
"A Markov Model for Web request Prediction", Habel Kurian, B. TECH Computer, Dr. Babasaheb Ambedkar Technological University, 2005.

* cited by examiner

*Primary Examiner* — Christopher Biagini
(74) *Attorney, Agent, or Firm* — Lowenstein Sandler LLP

(57) ABSTRACT

Ordering of digital content based on models is presented. A user request for digital content is received. A content prefetching model is selected from a plurality of content prefetching models. The content prefetching model is used for prefetching a plurality of portions of the digital content. The content prefetching models are generated based on prior history associated with the digital content. A prefetch sequence for the digital content is generated based on the selected content prefetching model. The plurality of portions can be obtained using the prefetch sequence.

19 Claims, 20 Drawing Sheets

ORDERING OF DIGITAL CONTENT BASED ON A CONTENT MODEL

RELATED APPLICATIONS

The present application is related to U.S. patent application Ser. No. 13/629,010, entitled "Ordering of Digital Content Based on a Content Model", filed on Sep. 27, 2012.

TECHNICAL FIELD

Implementations of the present disclosure relate to the field of accessing digital content and, more particularly, to ordering of digital content based on a content model.

BACKGROUND

On the Internet, content hosting websites allow users to upload, view, and share digital content. Such digital content may include audio clips, movie clips, TV clips, and music videos, as well as amateur content such as video blogging and short original videos. Typically, users are directed to digital content on a content hosting site via a Uniform Resource Locator (URL) link shared by another user, or via a search for particular content on the content hosting site. The URL link clicked on by a user directs the user to a watch page that plays the digital content for the user.

When a user requests digital content, the user would like to view the digital content immediately, without having to wait for the digital content player to buffer or load the digital content. Generally, the digital content player requests contiguous portions, or chunks, of the digital content from the server storing the digital content. For example, the digital content player will first request the first 10 seconds of the digital content, then the second 10 seconds of the digital content, then the third 10 seconds of the digital content, etc. Therefore, the user does not have to wait for the digital content to play, load or buffer as long as the user plays the digital content in the same order that the digital content player is requesting the digital content from the server. However, if a user wants to skip a portion of the digital content while the digital content is playing, the user may have to wait for the next portion of the digital content to load because the digital content player may not have loaded the next portion of digital content yet.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

Ordering of digital content based on a content model is presented. A user request for digital content is received. A content prefetching model is selected from a plurality of content prefetching models. The content prefetching model is used for prefetching a plurality of portions of the digital content. The content prefetching models are generated based on prior history associated with the digital content. A prefetch sequence for the digital content is generated based on the selected content prefetching model. The plurality of portions can be obtained using the prefetch sequence.

In additional implementations, computing devices for performing the operations of the above described implementations are also implemented. Additionally, in implementations of the disclosure, a computer readable storage media stores methods for performing the operations of the above described implementations.

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
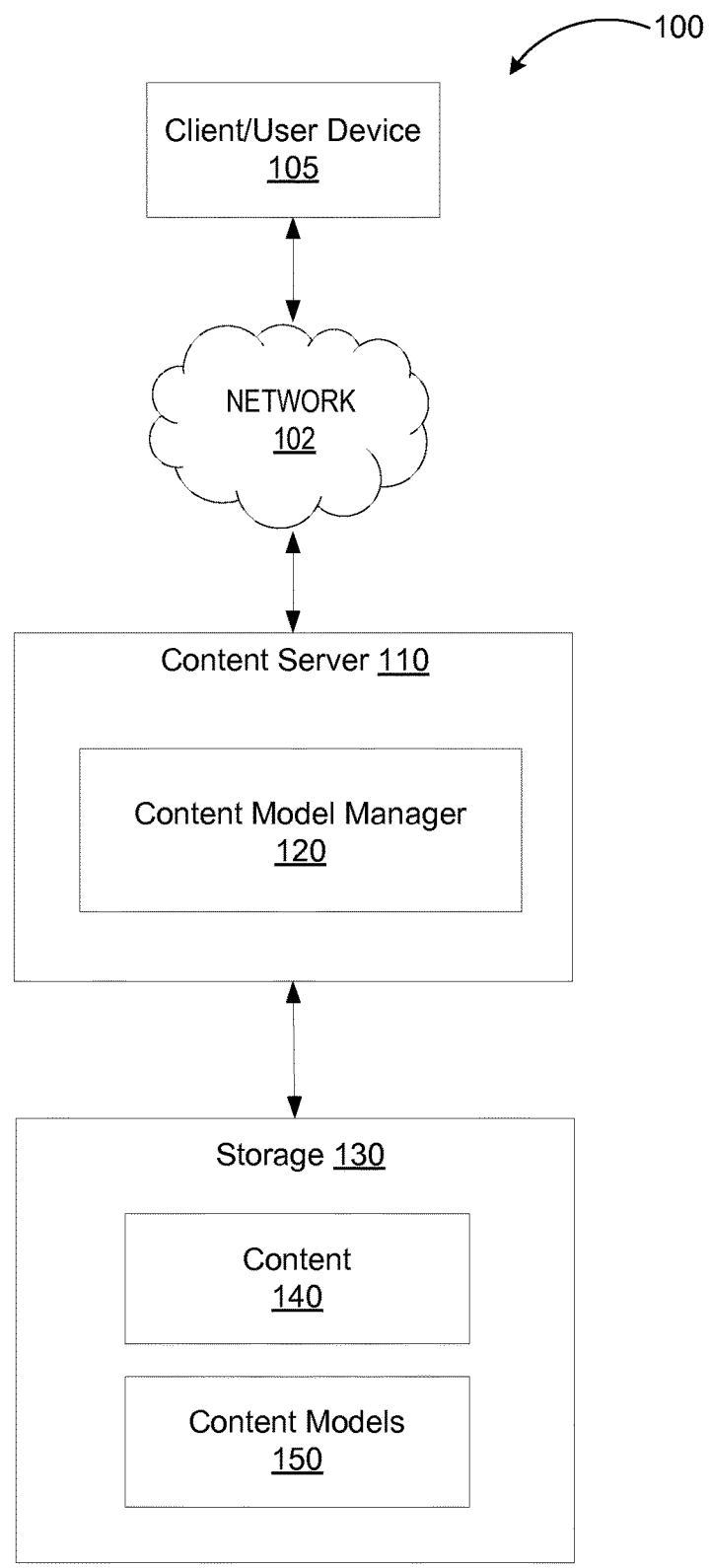
FIG. 1 is a block diagram of an exemplary system architecture, in which implementations of the present disclosure may operate.

Implementations of the disclosure pertain to an ordering of digital content based on a content model. When a user requests digital content, the user would like to view the digital content immediately, without having to wait for the digital content player to buffer or load the requested digital content. Generally, a digital content player requests contiguous portions, or chunks, of the digital content from the server storing the digital content. For example, the digital content player will first request the first 10 seconds of the digital content, then the second 10 seconds of the digital content, then the third 10 seconds of the digital content, etc., and buffer the received portions of the digital content until the portions are loaded to present to the user. Therefore, the user does not have to wait for the digital content to load or buffer as long as the user plays the digital content in the same order that the digital content player is requesting the digital content from the server, which is generally a chronological order. However, if a user wants to skip to a certain part of the digital content while the digital content is playing or play the digital content in a non-chronological order, the user may have to wait for the certain part of the digital content to load because the digital content player may not have requested and loaded that certain part of the digital content yet. For example, when playing a movie X, a user may want to skip the first 3 minutes, which may be the previews and opening credits, and start watching from minute 3, which may be the beginning of the movie X. The digital content player may have requested and buffered the first minute of the digital content, but may not have requested and buffered minute 3 yet. The digital content player will have to request the digital content associated with minute 3 from the server, causing the user to wait until the digital content player receives minute 3 from the server.

Implementations of the present disclosure provide an efficient way for the digital content player to buffer, load and/or play digital content requested by a user. The digital content player can request portions of the digital content in an order that is based on a content model for the requested digital content. The content model can be selected from different content models generated for the digital content. Each content model can represent an order or sequence for the portions of the requested digital content that is based on one or more collected statistics for the digital content. For example, the content model can be selected based on a number of times that the digital content has been selected or loaded by the digital content player, a number of users that have selected the digital content, an effectiveness of the model as applied to the digital content, the user requesting the digital content, features of the digital content, the geographic location of the user or of the server storing the digital content, etc. Once the order or sequence is determined, the digital content player can request the portions of the requested digital content in the determined order, such that a user does not have to wait for the digital content to buffer, load and/or play. Implementations of the present disclosure further generate the content models for the digital content.

FIG. 1 illustrates an exemplary system architecture 100, in accordance with one implementation of the present disclosure. System 100 comprises a client/user device 105 in communication with (e.g., coupled to) a content server 110 over a network 102, and a storage system 130. The network 102 may be a private network (e.g., a local area network (LAN), a wide area network (WAN), intranet, etc.), a corporate network (e.g., a private network for an organization such as a corporation), a broadcast network, a public network (e.g., the Internet), a wired network (e.g., Ethernet network), a wireless network (e.g., an 802.11 network) and/or a cellular network (e.g., a Long Term Evolution (LTE) network).

The client/user device 105 may be any type of computing device, for example, a device including a processor, a computer-readable medium, and a memory. In some implementations, the client/user device 105 may be executing a browser application or other application adapted to communicate over Internet related protocols (e.g., TCP/IP and HTTP) and/or display a user interface. While only a single client/user device 105 is shown in FIG. 1, system 100 may support a large number of concurrent sessions with many client/user devices 105.

The content server 110 may include computing devices that have a wide range of processing capabilities such a personal computer (PC), a server computer, a personal digital assistant (PDA), a smart phone, a laptop computer, a netbook computer, a tablet device, and/or any machine capable of executing a set of instructions (sequential or otherwise) that specify actions to be taken by that machine. Implementations of the disclosure may operate within a single server device or on multiple server devices.

In one implementation, the content server 110 provides digital content (e.g., digital video, streaming video, images, digital music, streaming music, etc.) to one or more of the client/user device 105. For example, the content server 110 may provide a streaming video requested by a user for playback on the client/user device 105 via the network 102.

Storage 130 can include one or more writable persistent storage devices, such as memories, tapes or disks. Although each of content server 110 and storage system 130 are depicted in FIG. 1 as single, disparate components, these components may be implemented together in a single device or networked in various combinations of multiple different devices that operate together. Examples of devices may include, but are not limited to, servers, mainframe computers, networked computers, process-based devices, and similar type of systems and devices.

Storage 130 may include content 140 and content models 150. Content 140 may include digital content accessible to the client/user device 105. Content models 150 may include one or more models generated by the content server 110 for digital content, such as content 140. The content models 150 can include a histogram model, an order of play model, and/or a decision tree model for the digital content. In some embodiments, the content models 150 can further include statistics related to digital content and/or play sequences recorded for the digital content that were used to generate the content models 150.

During operation of system 100, a user accesses system 100 via client/user device 105 over network 102. The content server 110 receives communications from the client/user device 105, and processes and/or directs these communications accordingly.

As discussed above, conventionally, when a user requests a portion of digital content in a non-chronological order, the user typically has to wait for the digital content player to buffer, load and/or play the requested portion because the digital content player has not yet received the requested portion of the digital content from a content server. Implementations of the present disclosure address this problem by requesting portions of the digital content in an order that is based on a content model for the requested digital content. A content model is a model of how the digital content has been played previous to the user request, and can represent the order by which portions of the digital content should be obtained.

In particular, in one implementation, when a user requests digital content to view, the content server 110 receives the request and selects a content model for the digital content. In one embodiment, the content server 110 will use the content model to prefetch portions of the digital content. In an alternate embodiment, the content server 110 will use the content model to play portions of the digital content. In one implementation, the content server 110 includes a content model manager 120 that selects a content model for the digital content from content models 150. The content models 150 can include one or more content models for each distinct digital content stored in content 140. In one implementation, content models 150 includes a histogram model for each distinct digital content stored in content 140. The histogram model can represent a distribution of portions of each distinct digital content based on a number of times each portion was watched. In some implementations, content models 150 can further include an order of play model and/or a decision tree model for each distinct digital content stored in content 140. The order of play model can represent a distribution of portions of each distinct digital content based on a number of times each portion was watched taking into account an order in which the portions were played. The decision tree model can represent a distribution of portions of each distinct digital content based on the number of times each portion was watched taking into account an order in which the portions were played and based on the user and/or a previous action taken. For example, if content 140 includes video X, video Y, and video Z, content models 150 includes a histogram model, an order of play model, and a decision tree model for video X, a histogram model, an order of play model, and a decision tree model for video Y, and a histogram model, an order of play model, and a decision tree model for video Z.

The content model manager 120 can obtain the selected content model from content models 150 and generate a sequence for multiple portions of the digital content based on the selected content model. The content model manager 120 can request the portions of the digital content from content 140 in an order based on the sequence. Once content 140 transmits the portions of the digital content to the content server 110, the content model manager 120, or the content server 110, can provide the portions of the digital content to the client/user device 105 in the order based on the sequence. In one implementation, the client/user device 105 considers the provided portions as prefetched portions of the digital content, and buffers the portions to provide to the user should the user request the portions. In an alternate implementation, rather than first buffering the portions, the client/user device 105 plays or presents the portions to the user using an application (e.g., a web browser) on the client/user device 105.

In one implementation, the content server 110 includes a content model manager 120 that generates content models for digital content. In particular, as digital content is accessed or requested by one or more client/user devices 105, the content model manager 120 receives each request and can record a play sequence of the digital content as the digital content is being accessed. The content model manager 120 can further collect statistics for each play sequence and generate one or more content models for the digital content based on the collected statistics. In one implementation, the content model manager 120 generates multiple content models for the digital content based on the collected statistics, such as a histogram model, an order of play model, and a decision tree model. Once the content model manager 120 has generated the one or more content models for the digital content, the content model manager 120 can store the content models in content models store 150.

Figure 2:
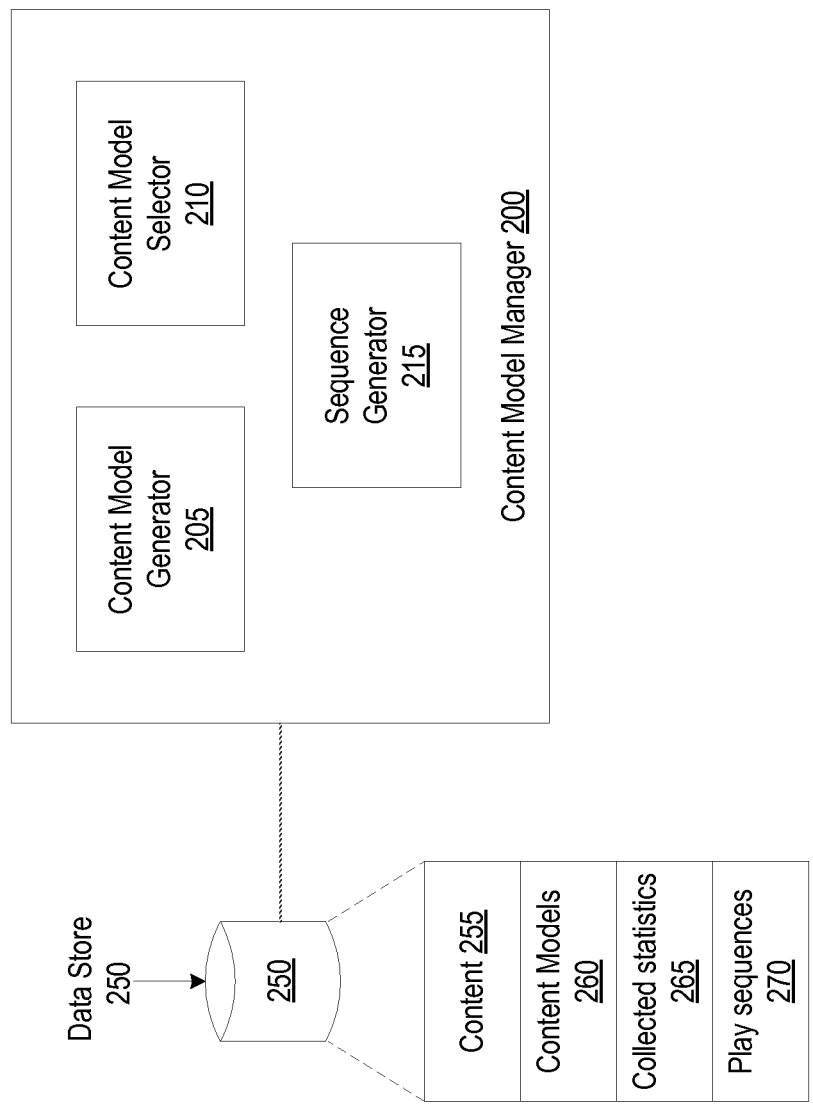
FIG. 2 is a block diagram of a content model manager, in accordance with one implementation of the present disclosure.

FIG. 2 illustrates a content model manager 200, in accordance with one implementation of the present disclosure. The content model manager 200 may include a content model generator 205, a content model selector 210, and a sequence generator 215. More or less components may be included in the content model manager 200 without loss of generality.

The content model generator 205 may generate one or more content models for digital content based on statistics collected for the digital content. In one implementation, the statistics are collected for play sequences recorded for the digital content. The content models can represent the play sequences and the portions of the digital content that were played historically for the digital content. Each play sequence recorded for the digital content can include information about which portions of the digital content were played or accessed while the digital content was presented to a user, etc. In one embodiment, the play sequences recorded for the digital content can be recorded by the content model generator 205. In an alternate embodiment, the play sequences are recorded by a digital content player (not shown). The play sequences recorded for the digital content can be stored in play sequences 270 in data store 250.

The statistics collected for the play sequences can include information about the order that the portions of the digital content were played or accessed while the digital content was presented to a user, information about the user playing or accessing the digital content, etc. In one implementation, the statistics are collected by the content model generator 205. In an alternate implementation, the statistics are collected by a digital content player (not shown). The statistics collected for the digital content can be stored in collected statistics 265 in data store 250.

In one implementation, the content model generator 205 generates the one or more content models using the collected statistics 265 for play sequences 270. In some implementations, the one or more content models are content prefetching models to use for prefetching one or more portions of the digital content. In some implementations, the one or more content models are content playing models to use for playing one or more portions of the digital content. The generated content models can include a histogram model, an order of play model, and/or a decision tree model. In some implementations, the content model generator 205 generates one or more of the content models when one or more of the collected statistics for the digital content has reached a threshold value (e.g., a histogram model when the number of times the digital content has been viewed reaches 100, an order of play model when the number of times the digital content has been viewed reaches 10000, a decision tree model when the number of times the digital content has been viewed reaches 100000, etc.).

The content model selector 210 may select a content model from content models available for digital content requested by a user. The content model selector 210 can select the content model from content models 260. In one implementation, each digital content in content 250 (e.g., each streaming video, streaming music, etc.) includes corresponding content models in content models 260. In one implementation, the content model selector 210 selects the content model based on whether a collected statistic for the digital content has reached one or more threshold values. The one or more threshold values can be defined by a system administrator, a user, a digital content provider, etc. In an alternate implementation, the content model selector 210 selects the content model based on access information in the content models for the digital content.

In some implementations, the content model selector 210 switches from one content model to another content model in content models 260 upon the occurrence of a predefined event. In one implementation, the predefined event can occur when a predefined threshold has been reached for a collected statistic for the digital content. The value for the predefined threshold can be defined by a system administrator, a user, a digital content provider, etc. In another implementation, the predefined event occurs when the content model selector 210 determines that the currently selected content model is not effective for the digital content based on access information for the currently selected content model, as will be discussed in more detail below.

The sequence generator 215 generate a sequence for portions of digital content in content 255 using the content model selected by content model selector 210. In one implementation, the sequence is a prefetch sequence that includes a prefetch order for the portions of the digital content. In an alternate implementation, the sequence is a play sequence that includes a play order for portions of the digital content.

Figure 3:
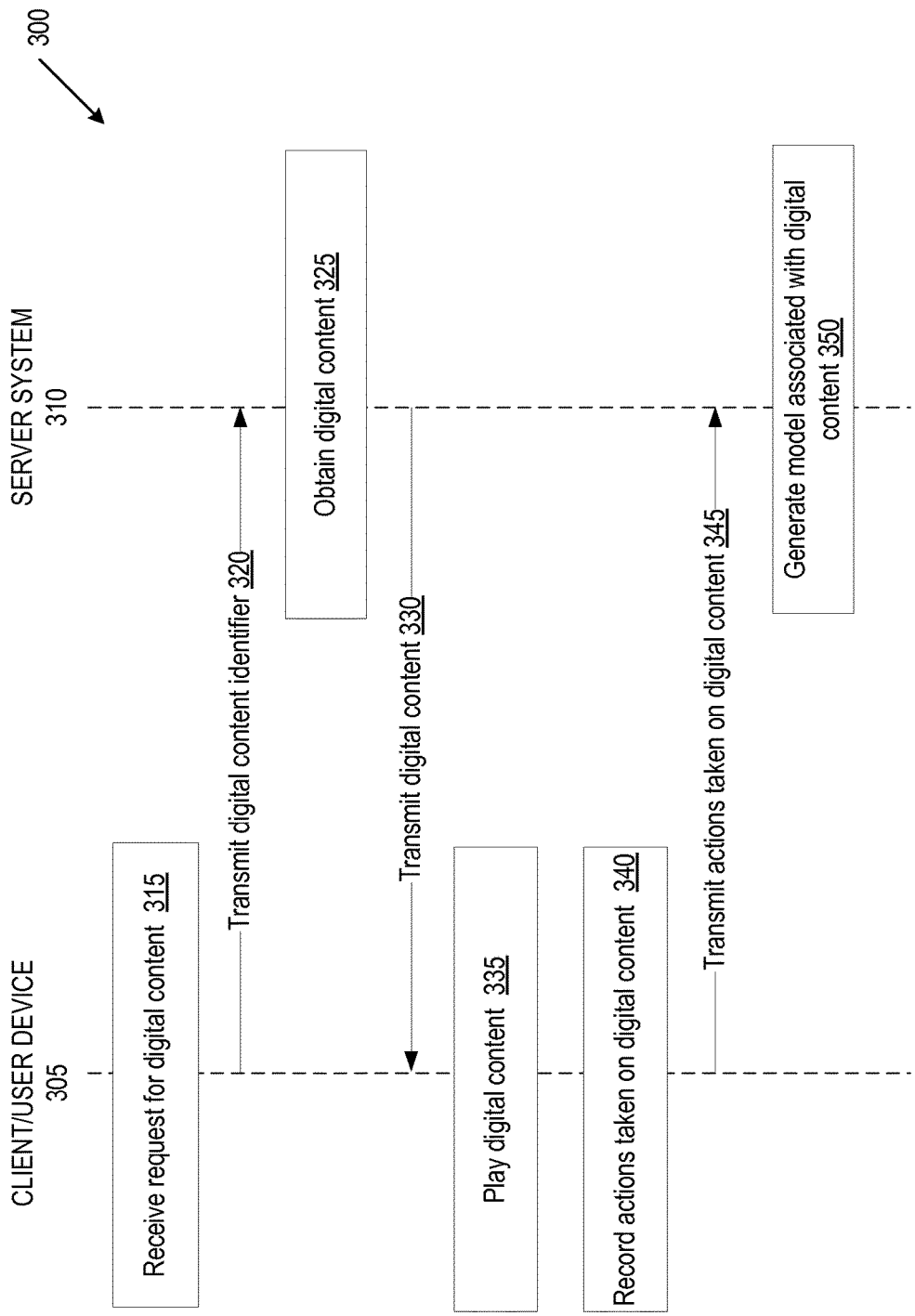
FIG. 3 is a sequence diagram of one implementation for generating a content model for digital content.

FIG. 3 is a sequence diagram of one implementation for generating a content model for digital content. A client or user device 305 (e.g., a mobile phone, a personal computer, etc.) may be connected to a server system 310. The client or user device 305 can receive a request for digital content at block 315, such as from a user. The client or user device 305 can transmit a digital content identifier to the server system 310 (block 320) in order to obtain the digital content on the client or user device 305. The server system 310 can obtain the digital content at block 325 using the digital content identifier. For example, the server system 310 can obtain the digital content by accessing a repository and obtaining the digital content in the repository that has the digital content identifier. The server system 310 transmits the digital content to the client or user device 305 at block 330.

Once the client or user device 305 has received the digital content from the server system 310, the client or user device 305 can buffer, load and play the digital content. For example, the client or user device 305 can present the digital content to a user. The user may take different actions on the digital content, such as playing the digital content in an order that is not chronological. At block 340, the client or user device 305 can record the actions taken on the digital content, such as the play order. The client or user device 305 can also record additional information when the digital content is played, such as one or more characteristics (e.g., age, gender, geographic location, etc.) of the user that is playing the digital content, a geographic location of the user, features of the digital content, etc. The client or user device 305 can transmit the actions and additional information to the server system 310 at block 345.

At block 350, the server system 310 can receive the actions taken on the digital content and generate a model associated with the digital content. The server system 310 can use the actions taken on the digital content, as well as any additional information received from the client or user device 305 to generate the model. Upon receiving the actions taken on the digital content, the server system 310 can update a parameter value for the digital content, such as increasing a number of times the digital content has been viewed (e.g., incrementing the parameter value once the actions are received), increasing a number of users that the digital content has been viewed by (e.g., determining whether the digital content has been previously viewed by the user and incrementing the number of users if the user has not previously been viewed by the user), etc. The server system 310 can obtain additional information about the digital content to use in generating the model, such as a geographic location of the digital content, features of the digital content, etc.

Figure 4:
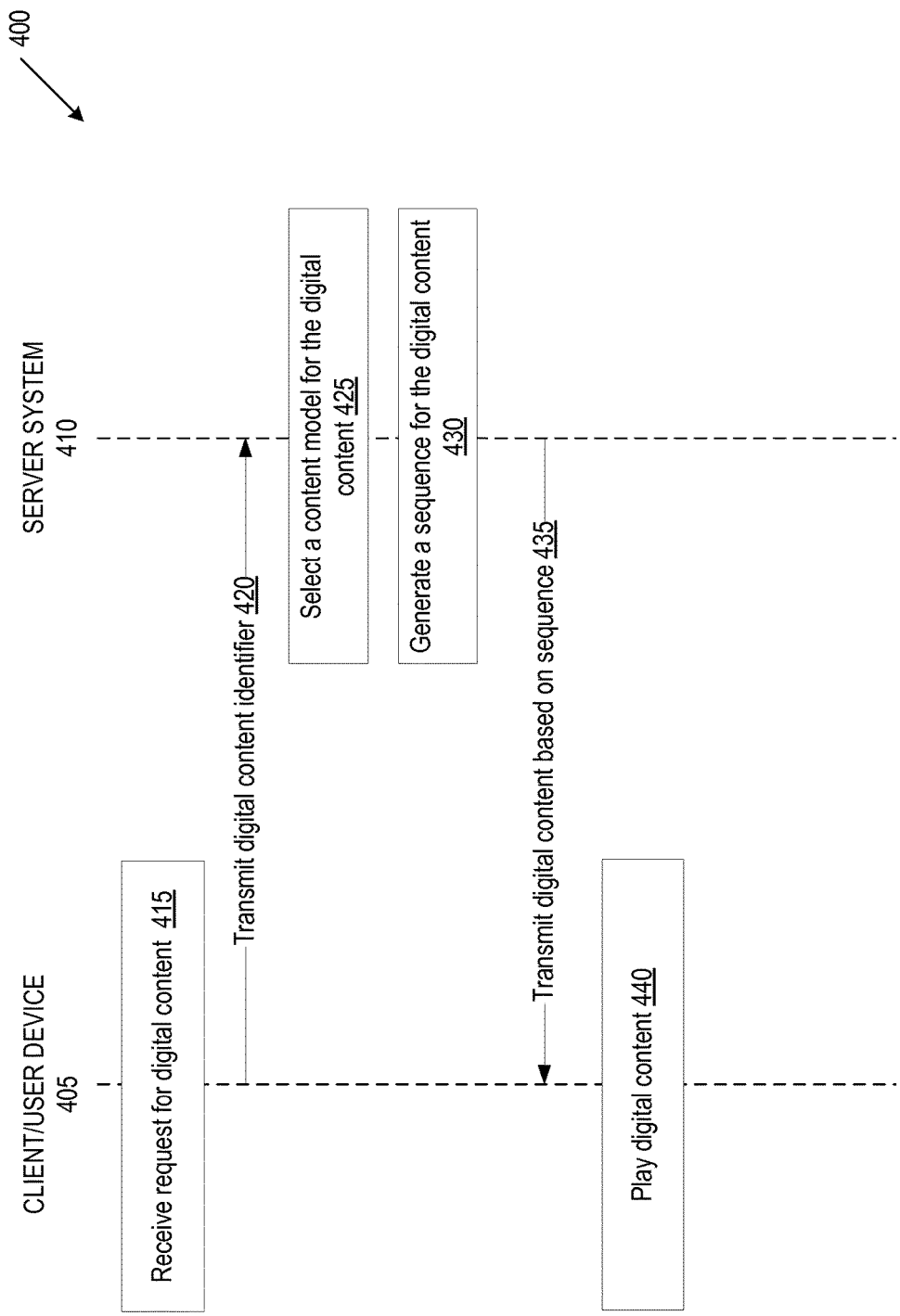
FIG. 4 is a sequence diagram of one implementation for ordering digital content based on a content model.

FIG. 4 is a sequence diagram of one implementation for generating a sequence for digital content. A client or user device 405 (e.g., a mobile phone, a personal computer, etc.) may be connected to a server system 410. The client or user device 405 can receive a request for digital content at block 415, such as a request from a user for a video, music, etc. The client or user device 405 can transmit a digital content identifier to the server system 410 (block 420). The server system 410 can select a content model for the digital content associated with the identifier at block 425. The content model can be selected from a group of content models for the digital content based on a parameter value for the digital content, based on the user, based on an effectiveness of each content model, etc.

Once the content model is selected, the server system 410 can generate a sequence for the digital content. In one implementation, the sequence is a prefetch sequence that includes a prefetch order for portions of the digital content. In one implementation, the sequence is a play sequence that includes a play order for portions of the digital content.

In one implementation, the server system 410 transmits the digital content in an order that is based on the sequence (block 435). In one implementation, if the sequence is a prefetch sequence, the client or user device 405 can buffer the transmitted digital content. At block 440, the client or user device 405 can play the digital content.

In an alternate implementation, the server system 410 transmits the content model for the digital content to the client or user device 405, and the client or user device 405 generates the sequence for the digital content based on the content model. In this implementation, upon generating the sequence for the digital content, the client or user device 405 can request the digital content from the server system 410 in an order based on the sequence.

For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Figure 5:
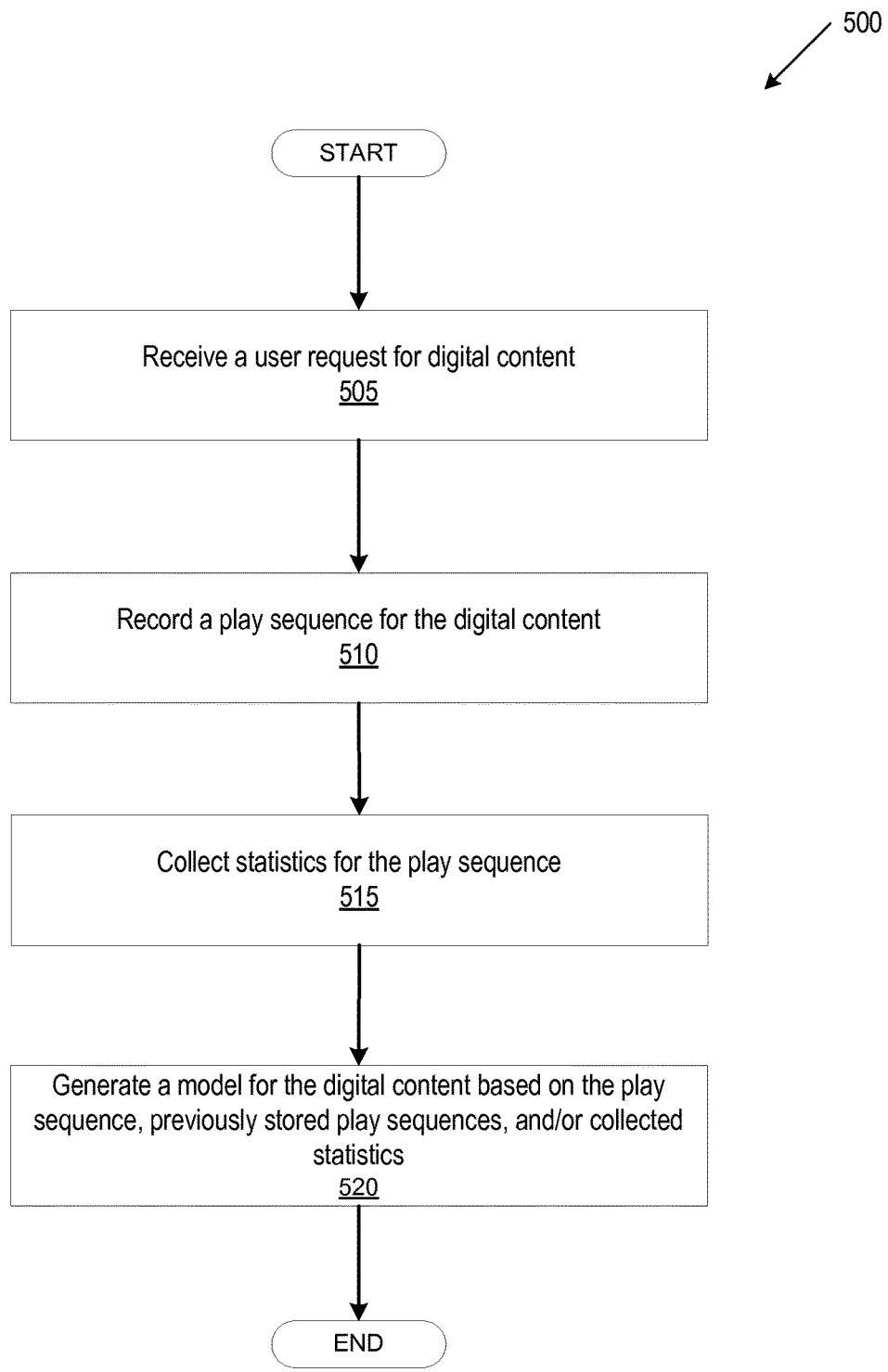
FIG. 5 is a flow diagram of one implementation for a method of generating a model for digital content.

FIG. 5 is a flow diagram of one implementation for a method of generating a model for digital content. The method 500 may be performed by processing logic that may include hardware (e.g., circuitry, dedicated logic, programmable logic, microcode, etc.), software (e.g., instructions run on a processing device to perform hardware simulation), or a combination thereof. In one implementation, the method 500 is performed by a server (e.g., the content server 110 of FIG. 1).

At block 505, processing logic receives a user request for digital content. Digital content may be requested by a user from a content provider, such as a content hosting website. In some implementations, the digital content may be requested by a user by clicking on a link (e.g., URL) or a graphic representation for the digital content (e.g., picture).

At block 510, processing logic records a play sequence for the digital content. In one implementation, the play sequence includes a listing of parts of the digital content that were accessed by the user in the order that the parts were accessed. For example, the play sequence can include: 0:00-2:59, 4:00-5:00, 4:00-15:59, 17:01-20:00 to represent that the user watched the portion of 0:00-2:59 of the digital content, then skipped portion 3:00-3:59, then watched the portion 4:00-5:00 of the digital content, then rewound back to watch 4:00-15:59, then skipped to watch 17:01-20:00.

In an alternate implementation, the play sequence includes a listing of all parts of the digital content and an action that was taken on each part. The actions can indicate that the user is accessing or playing the digital content in an order that is not chronological. The actions can include skipping a part of the digital content, rewinding the digital content, fast forwarding the digital content, stopping the digital content, etc. For example, the play sequence for digital content that is 20:00 long can include 0:00-2:59 accessed, 3:00-3:59 skipped, 4:00-5:00 accessed, 4:00-5:00 rewound, 4:00-15:59 accessed, 16:00-17:00 fast forwarded, 17:01-20:00 accessed, 20:00 stopped.

In another alternate implementation, the play sequence includes a listing of the parts of the digital content affected by an action and the action that affected each part. In one implementation, a part affected by an action is a part on which an action was taken. For example, a part on which an action was taken can be the part of the digital content that was skipped, the part of the digital content that was rewound, the part of the digital content that was fast forwarded, the part of the digital content at which the playing of the content was stopped, etc. In this implementation, an exemplary play sequence for digital content that is 20:00 long can include: 3:00-3:59 skipped, 4:00-5:00 rewound, 16:00-17:00 fast forwarded, 20:00 stopped, which would represent that the user accessed the digital content as follows: 0:00-2:59, 4:00-5:00, 4:00-15:59, 17:01-20:00. In an alternate implementation, a part affected by an action is a part of the digital content chronologically related to a part of the digital content on which an action was taken. For example, a part affected by an action can be a part of the digital content that was accessed before and/or after the digital content was rewound, a part of the digital content that was accessed before and/or after the digital content was fast forwarded, a part of the digital content that was accessed before and/or after a part of the digital content was skipped, etc. In this implementation, an exemplary play sequence for digital content that is 20:00 long can include: 4:00 was played after 2:59, 4:00 was played after 4:00-5:00, 17:01 was played after 15:59, which would represent that the user accessed the digital content as follows: 0:00-2:59, 4:00-5:00, 4:00-15:59, 17:01-20:00.

At block 515, processing logic can collect statistics for the play sequence. The statistics can include information about the digital content and/or information about the user accessing the digital content. The information about the digital content can include a number of times that the digital content has been requested and/or accessed, features of the digital content, a geographic location of the digital content, etc. The number of times that the digital content has been requested and/or accessed can be the number of times that the digital content has been requested and/or accessed by all users of a content hosting site, the number of times that the digital content has been requested and/or accessed by the current user requesting the digital content, a number of times that the digital content has been requested and/or accessed by a subset of users of a content hosting site, etc. The subset of users can be based on characteristics of the users, such as age, geographic location of the users, etc. The features of the digital content can include the type of digital content (e.g., movie, music, television show, etc.), a length of the digital content, a source that uploaded the digital content, etc. The geographic location of the digital content can be based on the geographic location of the server that provided the digital content, the geographic location of the server that originally received the digital content, etc. The information about the user accessing the digital content can include characteristics of the user requesting the digital content, a geographic location of the user requesting the digital content, etc. The characteristics of the user requesting the digital content can include an age of the user, a gender of the user, a nationality of the user, a viewing history for the user, etc.

At block 520, processing logic generates a model for the digital content based on the play sequence, any previous play sequences for the digital content, and the collected statistics. In one implementation, processing logic generates a model upon reaching a threshold, such as a when the digital content has been accessed a predefined number of times, when a predefined number of users have accessed the digital content, when the number of views for the digital content reaches a predetermined number, etc. In an alternate implementation, processing logic generates a model for the digital content periodically, such as after a predefined number of views or accesses (e.g., every 100 accesses), a predefined amount of time (e.g., once a day), etc. In another alternate implementation, processing logic generates a model for the digital content after each play sequence of the digital content.

To generate a model for the digital content, the processing logic can define portions for the digital content, calculate one or more values for the portions, and store the values with the portions as the model. The portions for the digital content can be based on the current play sequence and previous play sequences for the digital content. In one implementation, the previous play sequences for the digital content are defined by a previously generated model for the digital content.

In one implementation, the current play sequence and previous play sequences include a listing of parts of the digital content in the order that the parts were accessed. In this implementation, if there are no previous play sequences and/or previously generated model for the digital content, processing logic defines each part listed in the current play sequence as a portion for the digital content. In this implementation, if there are previous play sequences and/or a previously generated model for the digital content, processing logic compares each part listed in the current play sequence to the portions defined by the previous play sequences or previously generated model. If the parts defined by the current play sequence match the portions defined by the previous play sequences or previously generated model, the current play sequence does not include parts that are different than the previous play sequences and/or previously generated model, and all parts of the current play sequence are included in the previous play sequences and/or previously generated model, processing logic may not update the portions for the digital content.

In one implementation, if the parts defined by the current play sequence do not match the portions defined by the previous play sequences and/or previously generated model, and the current play sequence includes parts that are different than the previous play sequences and/or previously generated model or that were not included in the previous play sequences and/or previously generated model, processing logic can define these parts as portions for the digital content. For example, a current play sequence includes parts 0:00-0:30, 4:00-8:00, and 10:00-20:00, and a previously generated model includes portions 0:00-1:00, 1:01-4:00, 4:30-13:00, and 13:00-20:00. The parts 0:00-0:30, 4:00-8:00, and 10:00-20:00 do not exist in the previously generated model. Therefore, these parts can be defined as portions for the digital content, such that the updated portions for the digital content will be: 0:00-0:30, 0:00-1:00, 1:01-4:00, 4:00-8:00, 4:30-13:00, 10:00-20:00, and 13:00-20:00. In an alternate implementation, if the parts defined by the current play sequence do not match the portions defined by the previous play sequences and/or previously generated model, and the current play sequence includes parts that are different than the previous play sequences and/or previously generated model or that were not included in the previous play sequences and/or previously generated model, processing logic can update the portions for the digital content based on the parts of the current play sequence. For example, a current play sequence includes parts 0:00-0:30, 4:00-8:00, and 10:00-20:00, and a previously generated model includes portions 0:00-1:00, 1:01-4:00, 4:30-13:00, and 13:00-20:00. The parts 0:00-0:30, 4:00-8:00, and 10:00-20:00 are different than the portions in the previously generated model. Therefore, the portions for the digital content can be updated, such that the updated portions for the digital content will be: 0:00-0:30, 0:31-1:00, 1:01-4:00, 4:00-4:30, 4:31-8:00, 10:00-13:00, and 13:00-20:00.

In an alternate implementation, each play sequence includes a listing of all parts of the digital content and an action that was taken on each part. In this implementation, if there are no previous play sequences and/or previously generated model for the digital content, processing logic can define each part listed in the current play sequence with an action that indicates that the part was accessed (and not skipped, rewound, fast forwarded, stopped, etc.) as a portion for the digital content. In this implementation, if there are previous play sequences and/or a previously generated model for the digital content, processing logic can compare each accessed part listed in the current play sequence to the portions defined by the previous play sequences or previously generated model. If the accessed parts in the current play sequence do not match the portions defined by the previous play sequences or previously generated model, and the current play sequence does not include accessed parts that are different than the previous play sequences and/or previously generated model and all accessed parts of the current play sequence are included in the previous play sequences and/or previously generated model, processing logic may not update the portions for the digital content.

In one implementation, if the accessed parts in the current play sequence do not match the portions defined by the previous play sequences and/or previously generated model, and the current play sequence includes accessed parts that are different than the previous play sequences and/or previously generated model or that were not included in the previous play sequences and/or previously generated model, processing logic can define the accessed parts as portions for the digital content. For example, a current play sequence includes accessed parts 0:00-0:30, 4:00-8:00, and 10:00-20:00, and a previously generated model includes portions 0:00-1:00, 1:01-4:00, 4:30-13:00, and 13:00-20:00. The accessed parts 0:00-0:30, 4:00-8:00, and 10:00-20:00 do not exist in the previously generated model. Therefore, these accessed parts can be defined as portions for the digital content, such that the updated portions for the digital content will be: 0:00-0:30, 0:00-1:00, 1:01-4:00, 4:00-8:00, 4:30-13:00, 10:00-20:00, and 13:00-20:00. In an alternate implementation, if the accessed parts defined by the current play sequence do not match the portions defined by the previous play sequences and/or previously generated model, and the current play sequence includes accessed parts that are different than the previous play sequences and/or previously generated model or that were not included in the previous play sequences and/or previously generated model, processing logic can update the portions for the digital content based on the accessed parts of the current play sequence. For example, a current play sequence includes accessed parts 0:00-0:30, 4:00-8:00, and 10:00-20:00, and a previously generated model includes portions 0:00-1:00, 1:01-4:00, 4:30-13:00, and 13:00-20:00. The parts 0:00-0:30, 4:00-8:00, and 10:00-20:00 are different than the portions in the previously generated model. Therefore, the portions for the digital content can be updated, such that the updated portions for the digital content will be: 0:00-0:30, 0:31-1:00, 1:01-4:00, 4:00-4:30, 4:31-8:00, 10:00-13:00, and 13:00-20:00.

In another alternate implementation, the play sequence includes a listing of the parts of the digital content affected by a skipping action and the action that affected each part. If the parts of the digital content affected by an action are the parts on which the action was taken, processing logic can exclude these parts of the digital content and generate a new play sequence for the digital content from the remainder of the digital content. For example, a current play sequence for digital content that is 20:00 long includes parts of the digital content affected by a skipping action: 0:00-0:30, 4:00-4:15, and 12:00-12:30. A new play sequence for the digital content can be generated to include the accessed portions of the digital content: 0:31-3:59, 4:16-11:59, and 12:31-20:00. Processing logic can define the portions for the digital content by comparing the parts in the new play sequence to the portions defined by previous play sequences and/or a previously generated model as described above.

If the parts of the digital content affected by an action are the parts of the digital content chronologically related to a part of the digital content on which an action was taken, processing logic can defined the portions of the digital content by comparing the parts of the current play sequence to the portions defined by previous play sequences and/or a previously generated model as described above.

In yet another alternate implementation, each portion of the digital content is a frame, which is the smallest unit of content that can be requested by a client or user device, or the smallest unit of content that a content server can send to a client or user device. In this implementation, processing logic separates the digital content into the portions represented by the frames. For example, if each frame is one second of the digital content and the digital content is 60 seconds long, the digital content will be separated into 60 portions, with each portion being one second of the digital content (e.g., portion 1 is second 1 of the digital content, portion 2 is second 2 of the digital content, etc).

Processing logic calculates one or more values for the portions of the digital content using the play sequences and the collected statistics. The values calculated by the processing logic can depend on the type of model being generated by the processing logic.

To generate a histogram model, processing logic can calculate a watch value for each portion of the digital content. The histogram model therefore can take into account the number of times that each portion was played by a user. The watch value can be calculated by determining which play sequences include the portion of the digital content, and incrementing the watch value by a value (e.g., 1) for each play sequence that includes the portion of the digital content. For example, if there are 4 play sequences with each play sequence including portion 3, one play sequence including portion 1, and two play sequences including portion 2, the watch value for portion 1 will be one, the watch value for portion 2 will be two, and the watch value for portion 3 will be four.

To generate an order of play model, processing logic can determine one or more order values for each portion of the digital content representing when the portion was played, and a watch value that corresponds to each order value. The order of play model therefore can take into account the order that the portions of the digital content were played and the number of times that each portion was played for that order value. For example, digital content has 4 play sequences: 1) portion 1, portion 3, portion 4, portion 2, 2) portion 1, portion 2, portion 3, portion 4, 3) portion 2, portion 3, portion 4, 4) portion 4, portion 1, portion 3, portion 2. In this example, portion 1 will include an order value of 1 with a watch value of 2, and an order value of 2 with a watch value of 1, because portion 1 was played first in 2 play sequences (the first and second play sequences), and second in 1 play sequence (the fourth play sequence). Portion 2 will include an order value of 1 with a watch value of 1, an order value of 2 with a watch value of 1, and an order value of 4 with a watch value of 1, because portion 2 was played first in 1 play sequence (the third play sequence), played second in 1 play sequence (the second play sequence), and fourth in 2 play sequences (the first play sequence and the fourth play sequence). Portion 3 will include an order value of 2 with a watch value of 2 and an order value of 3 with a watch value of 2, because portion 3 was played second in 2 play sequences (the first and third play sequences) and third in 2 play sequences (the second and fourth play sequences). Portion 4 will include an order value of 1 with a watch value of 1, an order value of 3 with a watch value of 2, and an order value of 4 with a watch value of 1, because portion 4 was played first in 1 sequence (the fourth sequence), third in 2 sequences (the first play sequence and the third play sequence), and fourth in 1 play sequence (the second play sequence).

In one implementation, processing logic can generate a decision tree model by determining a sequence of branching operations based on analysis of the portions and play sequences, and assigning probabilities to each branching operation based on the play analysis. The decision tree model can take into account a number of times each portion of the digital content was played in a particular order, as well as additional information about the digital content and/or the user requesting the digital content. One implementation of generating a decision tree model is described below with reference to FIG. 9.

A decision tree may also be generated using any one of various techniques known in the art for generating decision trees, without departing from the scope of this disclosure. In an alternate implementation, processing logic generates a decision tree model by using a Markov process or Markov chain based on the play sequences. A Markov process is a stochastic process with which a prediction for a future of the process can be made based solely on the process' present state. A Markov chain is a mathematical system that undergoes transitions from one state to another between a finite or countable number of possible states. Using the portions of the play sequences, the time period of the digital content that is represented by each portion can be defined as a state of the Markov chain or process. The order values of the portions can be used to define the transition between the states, with the choice of a next state only depending on the current state. The Markov chain or process can then determine probabilities for each transition that is possible from a current state to a next state. The Markov chain or process can be generated using the portions of the play sequences as the state space of the chain using any one of various techniques known in the art for generating Markov chains or processes, without departing from the scope of this disclosure.

In some implementations, the decision tree model can be used to generate a sequence that represents a most likely path for a user based on characteristics of the user, such as an age of the user, a geographic location of the user, historical information of how the user views digital content (either the current digital content or other digital content), etc. One implementation of generating an ordering based on a decision tree model using information associated with a user is described below with reference to FIG. 14. In some implementations, the decision tree model generates a most likely path for a user based on a previous action that the user took (e.g., requesting a certain portion of the digital content) and predicts the next action that the user will take based on that previous action. One implementation of generating an ordering based on a decision tree model using a previous action is described below with reference to FIG. 15. In some implementations, the decision tree model generates a most likely path for a user based on other information, such as a geographic location of the digital content, features of the digital content (e.g., a length of the digital content, a type of the digital content, etc.), etc.

Figure 6:
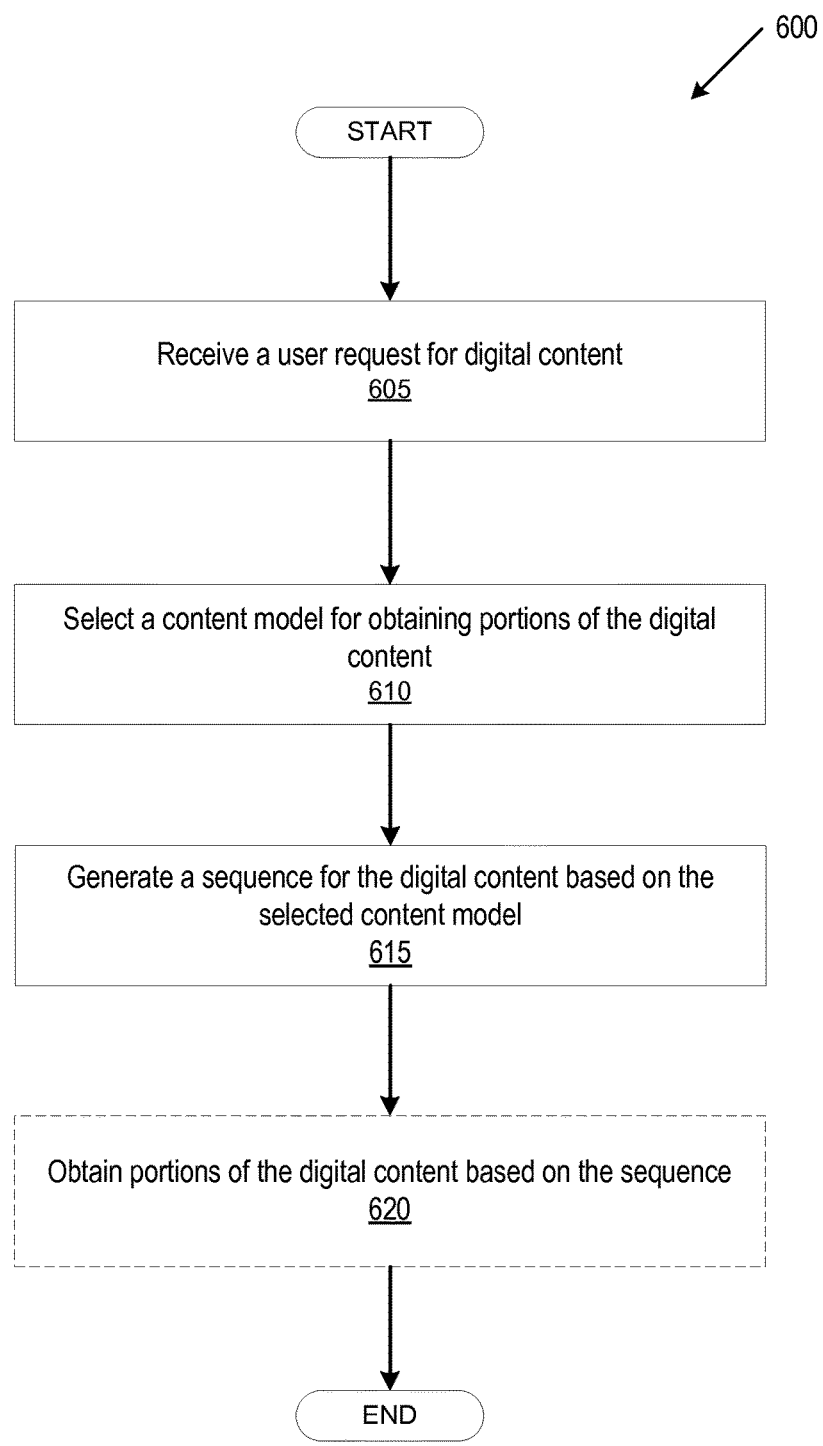
FIG. 6 is a flow diagram of one implementation for a method of ordering digital content based on a content model.

FIG. 6 is a flow diagram of one implementation for a method of ordering digital content based on a content model. The method 600 may be performed by processing logic that may include hardware (e.g., circuitry, dedicated logic, programmable logic, microcode, etc.), software (e.g., instructions run on a processing device to perform hardware simulation), or a combination thereof. In one implementation, the method 600 is performed by a server (e.g., the content server 110 of FIG. 1). In an alternate implementation, the method 600 is performed by a client or user device (e.g., the client/user device 105 of FIG. 1).

At block 605, processing logic receives a user request for digital content. Digital content may be requested by a user from a content provider, such as a content hosting website. In some implementations, the digital content may be requested by a user by clicking on a link (e.g., URL) or a graphic representation for the digital content (e.g., picture).

At block 610, processing logic selects a content model for obtaining portions of the digital content. The content model can be selected from a group of content models available for the digital content, such as a histogram model, an order of play model, a decision tree model, etc. In one implementation, the content models available for the digital content are generated based on a prior history of the digital content, such as previous play sequences of the digital content, as described above with reference to FIG. 5. In one implementation, the content model is a content prefetching model used for prefetching portions of the digital content. In an alternate implementation, the content model is a content playing model used for playing portions of the digital content.

In one implementation, processing logic can select the content model based on a threshold. One implementation of selecting a content model based on a threshold is described below with reference to FIG. 10. In an alternate implementation, processing logic can select the content model based on access information provided by each of the content models. One implementation of selecting a content model based on access information is described below with reference to FIG. 11. In another alternate implementation, processing logic can select the content model based on the information associated with the digital content, such as user information (e.g., age of user, geographic location of user, etc), information about the digital content (length of content, type of content, etc.), etc. In this implementation, if there is no information associated with the digital content, processing logic can select the histogram model or the order of play model for the digital content based on a threshold, as described below with reference to FIG. 10, based on access information, as described below with reference to FIG. 11, etc. In this implementation, if there is information about the user or the digital content, processing logic may select the decision tree model for the digital content because the decision tree model may be able to differentiate the most likely path for the digital content based on this information. For example, the decision tree model for digital content can predict that a user under 25 may be more likely to play the content out of order than a user that is over 55. In another example, the decision tree model can predict that a user living in California may be more likely to play the content is a first order and a user living in Florida may be more likely to play the content in a second order. In yet another example, the decision tree model can predict that digital content that is a television show will be more likely to be played in a non-chronological order because the user will skip the commercials in a television show, and can determine the most likely order to obtain the portions of the television show. Therefore, the decision tree model may be selected if information is available about the user and/or about the digital content because the decision tree model can be more effective than other content models given this information.

At block 615, processing logic generates a sequence for the digital content based on the selected content model. In one implementation, the sequence is a prefetch sequence to use to prefetch frames or portions of the digital content to buffer, such that the user requesting the content does not have to wait for the content to load, even if the content is requested in an order that is not chronological. In an alternate implementation, the sequence is a play sequenced to use to play frames or portions of the digital content by a digital content player.

Processing logic can generate the sequence for the digital content based on the selected content model by accessing the model for the digital content and determining an order for portions of the digital content based on the model. In some implementations, processing logic can generate a sequence for all of the portions of the digital content based on the selected content model. In some implementations, processing logic can generate a sequence for one or more portions of the digital content. The portions of the digital content for which processing logic generates a sequence can depend on the selected content model. If the selected content model is a histogram model, processing logic may be able to generate the sequence for all portions of the digital content by ordering the portions from most accessed to least accessed. One implementation of generating a sequence based on a histogram model is described below with reference to FIG. 12. If the selected content model is an order of play model, processing logic may be able to generate the sequence for all portions of the digital content by including the most accessed portion for each order value in the corresponding order value in the sequence. One implementation of generating a sequence based on an order of play model is described below with reference to FIG. 13. If the selected content model is a decision tree model that depends on user information, processing logic may generate a sequence for the digital content by determining a most likely path based on the user information. One implementation of generating a sequence based on a decision tree model using user information is described below with reference to FIG. 14. If the selected content model is a decision tree model that depends on a user's current action to determine the next portion in the sequence, processing logic may determine one or more portions of digital content in the sequence, cause those portion or portions of digital content to be obtained, then wait for the user's next action to determine the next part of the sequence (e.g., determine the next portions of digital content to obtain). One implementation of generating a sequence based on a decision tree model using a previous action is described below with reference to FIG. 15.

At optional block 620, processing logic can obtain portions of the digital content based on the sequence. In one implementation, processing logic obtains the portions of the digital content by requesting the portions of the digital content from a content server in the order that the portions are listed in the sequence. In an alternate implementation, processing logic obtains the portions of the digital content by accessing the content in storage accessible to the processing logic in the order that the portions are listed in the sequence. In some implementations, once processing logic obtains the portions of the digital content based on the sequence, the processing logic can provide the portions to a content player on a content hosting website.

Figure 7:
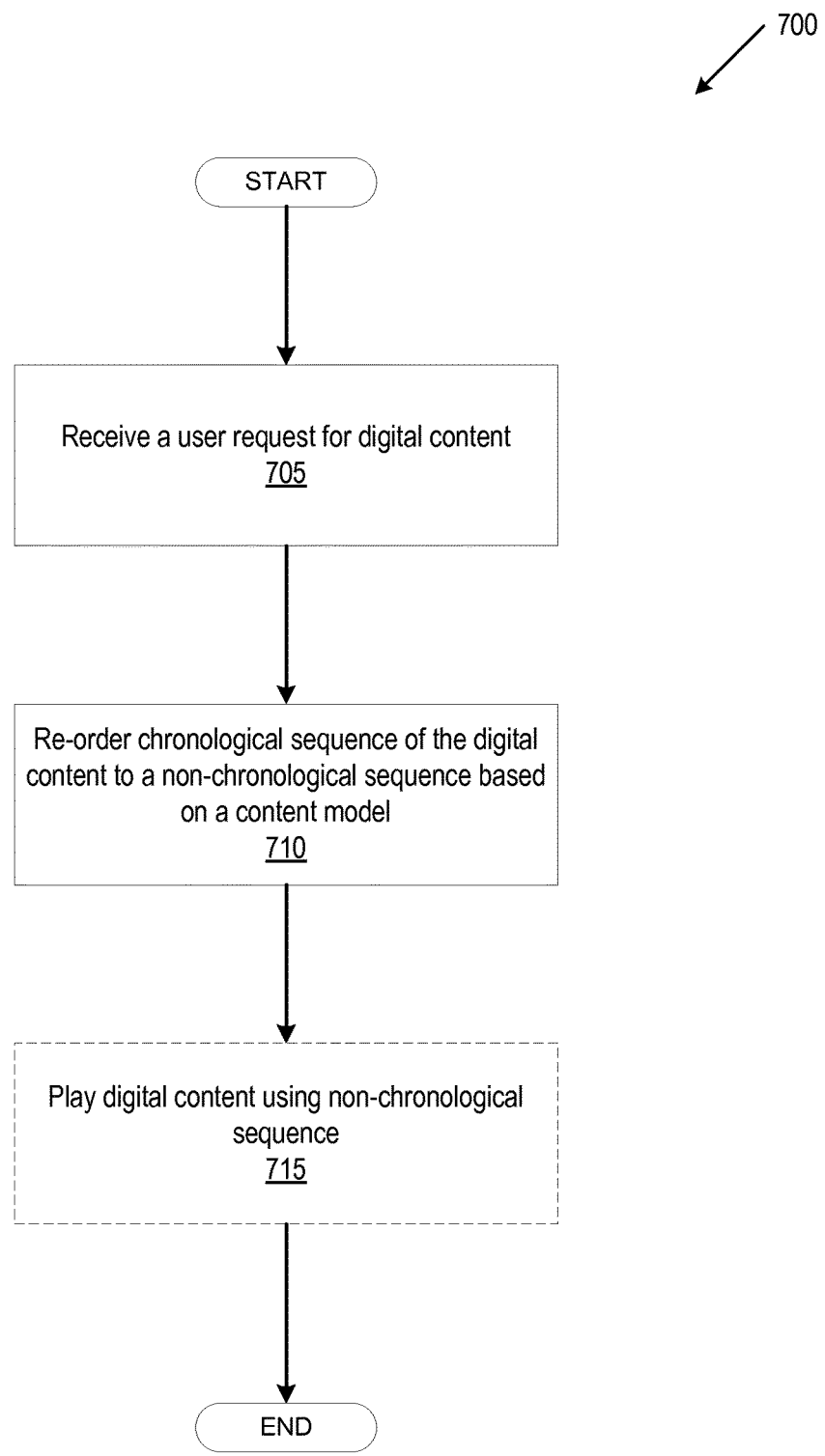
FIG. 7 is a flow diagram of one implementation for a method of reordering play of digital content based on a content model.

FIG. 7 is a flow diagram of one implementation for a method of reordering play of digital content. The method 700 may be performed by processing logic that may include hardware (e.g., circuitry, dedicated logic, programmable logic, microcode, etc.), software (e.g., instructions run on a processing device to perform hardware simulation), or a combination thereof. In one implementation, the method 700 is performed by a server (e.g., the content server 110 of FIG. 1). In an alternate implementation, the method 700 is performed by a client or user device (e.g., the client/user device 105 of FIG. 1).

At block 705, processing logic receives a user request for digital content. Digital content may be requested by a user from a content provider, such as a content hosting website. In some implementations, the digital content may be requested by a user by clicking on a link (e.g., URL) or a graphic representation for the digital content (e.g., picture).

At block 710, processing logic re-orders a chronological sequence of the digital content to a non-chronological sequence based on a content model. For example, digital content that is 20 minutes long will have a chronological sequence of 0:00-20:00. After re-ordering, the digital content will have a non-chronological sequence, such as 0:00-2:00, 4:00-6:00, 3:00-3:30, 10:00-20:00. In one implementation, the non-chronological sequence is a prefetch sequence to use to prefetch frames or portions of the digital content to buffer, such that the user requesting the content does not have to wait for the content to load, even if the content is requested in an order that is not chronological. In an alternate implementation, the non-chronological sequence is a play sequenced to use to play frames or portions of the digital content by a digital content player.

In one implementation, processing logic obtains the content model used to re-order the chronological sequence of the digital content to the non-chronological sequence from a server, such as a content server. In this implementation, processing logic can use the received content model to re-order the chronological sequence by accessing the model for the digital content and determining an order for portions of the digital content based on the model. In an alternate implementation, processing logic obtains the content model used to re-order the chronological sequence of the digital content to the non-chronological sequence by selecting the content model. The content model can be selected from a group of content models available for the digital content, such as a histogram model, an order of play model, a decision tree model, etc. In one implementation, the content models available for the digital content are generated based on a prior history of the digital content, such as previous play sequences of the digital content, as described above with reference to FIG. 5. In one implementation, processing logic can select the content model based on a threshold. One implementation of selecting a content model based on a threshold is described below with reference to FIG. 10. In an alternate implementation, processing logic can select the content model based on access information provided by each of the content models. One implementation of selecting a content model based on access information provided by the content models is described below with reference to FIG. 11. In another alternate implementation, processing logic can select the content model based on the information associated with the digital content, such as user information (e.g., age of user, geographic location of user, etc), information about the digital content (length of content, type of content, etc.), etc. In this implementation, if there is no information associated with the digital content, processing logic can select the histogram model or the order of play model for the digital content based on a threshold, as described below with reference to FIG. 10, based on access information, as described below with reference to FIG. 11, etc. In this implementation, if there is information about the user or the digital content, processing logic may select the decision tree model for the digital content because the decision tree model may be able to differentiate the most likely path for the digital content based on this information.

In some implementations, processing logic can re-order all the portions of the chronological sequence based on the content model. In some implementations, processing logic can generate a sequence for one or more portions of the digital content depending on the obtained content model. If the obtained content model is a histogram model, processing logic may be able to re-order the chronological sequence for all portions of the digital content by ordering the portions from most accessed to least accessed. One implementation of generating a sequence based on a histogram model is described below with reference to FIG. 12. If the accessed content model is an order of play model, processing logic may be able to re-order the chronological sequence for all portions of the digital content by including the most accessed portion for each order value in the corresponding order value in the sequence. One implementation of generating a sequence based on an order of play model is described below with reference to FIG. 13. If the accessed content model is a decision tree model that depends on user information, processing logic may re-order the chronological sequence for the digital content by determining a most likely path based on the user information. One implementation of generating a sequence based on a decision tree model using user information is described below with reference to FIG. 14. If the accessed content model is a decision tree model that depends on a user's current action to determine the next portion in the sequence, processing logic may re-order one or more portions of digital content and generate the non-chronological sequence for those one or more portions, cause those one or more portions of digital content to be obtained, then wait for the user's next action to determine the next part of the non-chronological sequence (e.g., determine the next portions of digital content to obtain). One implementation of generating a sequence based on a decision tree model using a previous action is described below with reference to FIG. 15.

At optional block 715, processing logic plays the digital content using the non-chronological sequence. In one implementation, processing logic plays the digital content using the non-chronological sequence by requesting portions of the digital content from a content server in the order that the portions are listed in the non-chronological sequence. In an alternate implementation, processing logic plays the digital content using the non-chronological sequence by accessing the content in storage accessible to the processing logic in the order that the portions are listed in the non-chronological sequence. In another alternate implementation, processing logic plays the digital content using the non-chronological sequence by providing portions of the digital content to a content player on a content hosting website in the order that the portions are listed in the non-chronological sequence.

Figure 8:
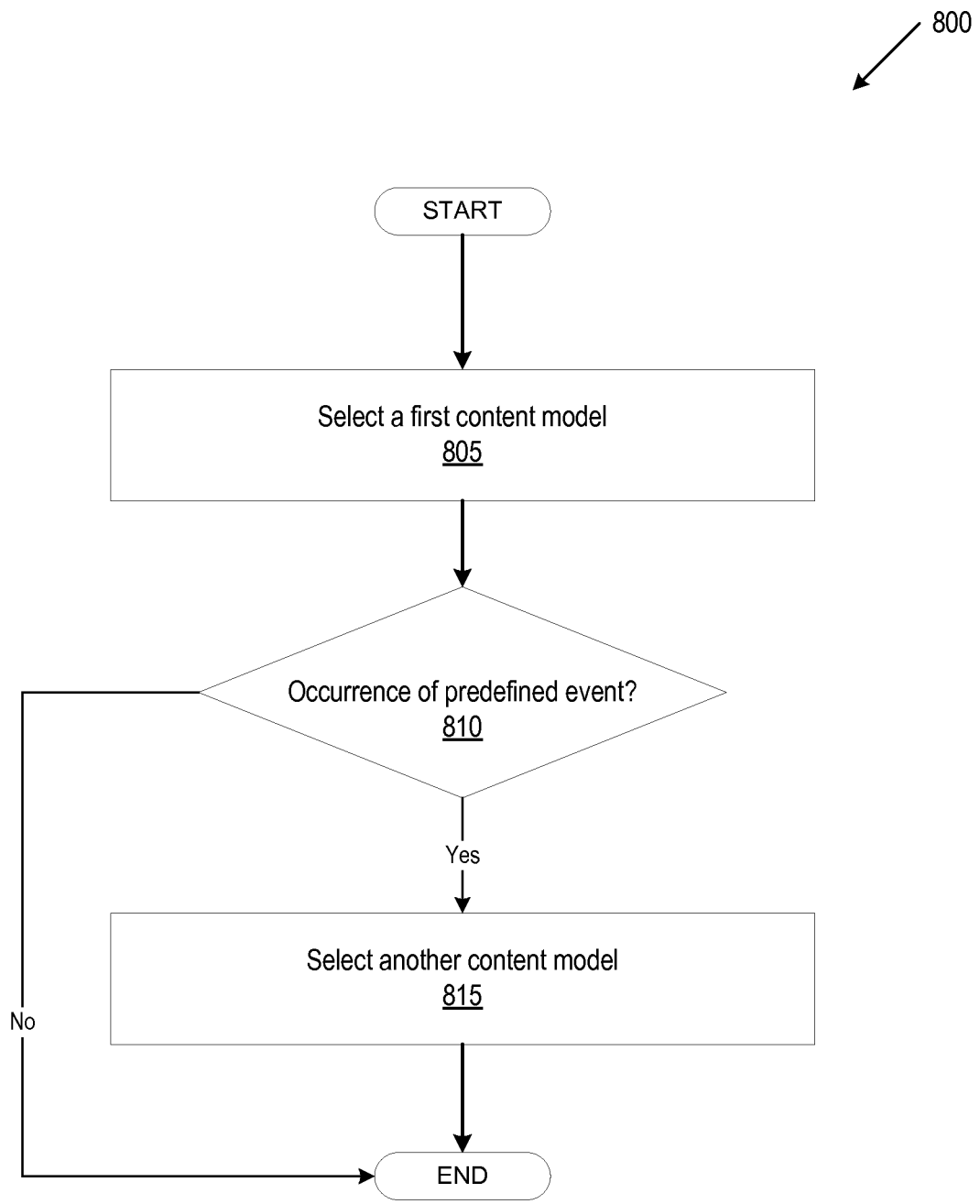
FIG. 8 is a flow diagram of one implementation for a method of switching from one content model to another content model.

FIG. 8 is a flow diagram of one implementation for a method of switching content models. The method 800 may be performed by processing logic that may include hardware (e.g., circuitry, dedicated logic, programmable logic, microcode, etc.), software (e.g., instructions run on a processing device to perform hardware simulation), or a combination thereof. In one implementation, the method 800 is performed by a server (e.g., the content server 110 of FIG. 1). In an alternate implementation, the method 800 is performed by a client or user device (e.g., the client/user device 105 of FIG. 1).

At block 805, processing logic selects a first content model. The first content model can be selected from a group of content models available for the digital content, such as a histogram model, an order of play model, a decision tree model, etc. In one implementation, the content models available for the digital content are generated based on a prior history of the digital content, such as previous play sequences of the digital content, as described above with reference to FIG. 5. In one implementation, the first content model is a content prefetching model used for prefetching portions of the digital content. In an alternate implementation, the first content model is a content playing model used for playing portions of the digital content.

In one implementation, processing logic can select the first content model based on a threshold. One implementation of selecting a content model based on a threshold is described below with reference to FIG. 10. In an alternate implementation, processing logic can select the first content model based on access information provided by each of the content models. One implementation of selecting a first content model based on access information provided by the content models is described below with reference to FIG. 11. In another alternate implementation, processing logic can select the first content model based on the information associated with the digital content, such as user information (e.g., age of user, geographic location of user, etc), information about the digital content (length of content, type of content, etc.), etc. In this implementation, if there is no information associated with the digital content, processing logic can select the histogram model or the order of play model for the digital content based on a threshold, as described below with reference to FIG. 10, based on access information, as described below with reference to FIG. 11, etc. In this implementation, if there is information about the user or the digital content, processing logic may select the decision tree model for the digital content because the decision tree model may be able to differentiate the most likely path for the digital content based on this information.

At block 810, processing logic determines whether there was an occurrence of a predefined event. If processing logic determines that there was not an occurrence of the predefined event, the method 800 ends. If processing logic determines that there was an occurrence of the predefined event, the method 800 continues to block 815.

In one implementation, the predefined event occurs when a predefined threshold value is reached. The predefined threshold can be a predetermined number of views for the digital content, a predetermined number of accesses for the digital content, a predetermined number of different users to access or view the digital content, a predetermined amount of time passing from when the first content model was selected, etc. For example, the predefined threshold can be 100,000 views for the digital content. The value for the predefined threshold can be defined by a system administrator, a user, a digital content provider, etc.

In an alternate implementation, the predefined event occurs when processing logic determines that the first content model is not effective for the digital content based on the access information for the first content model. In some implementations, processing logic determines whether the first content model is not effective for the digital content by comparing access information included in the first content model for portions of the digital content.

If the first content model is a histogram model with multiple portions, and the access information (e.g., watch values) for one or more portions in the histogram model is equivalent or nearly equivalent to the access information for other portions, processing logic can determine that the histogram model is not effective for the digital content. For example, the digital content has 3 portions and the histogram model includes access information: watch value of the first portion is 10, watch value of the second portion is 8, and the watch value of the third portion is 100. The histogram model can be determined to not be effective because the watch value of the first portion is nearly equivalent to the watch value of the second portion.

If the first content model is an order of play model with multiple portions, and the access information (e.g., watch value) for a number of portions at an order value in the order of play model are equivalent or nearly equivalent, processing logic can determine that the order of play model is not effective for the digital content. For example, the digital content has 3 portions and the order of play model includes access information: watch value of the first portion at order value 1 is 5, watch value of the first portion at order value 2 is 4, watch value of the first portion at order value 3 is 0, watch value of the second portion at order value 1 is 1, watch value of the second portion at order value 2 is 4, watch value of the second portion at order value 3 is 1, watch value of the third portion at order value 1 is 3, watch value of the third portion at order value 2 is 0, watch value of the third portion at order value 3 is 10. The order of play model can be determined to not be effective because the watch value of the first portion at order value 1 is nearly equivalent to the watch value of the third portion at order value 1 (5 is nearly equivalent to 3), the watch value of the first portion at order value 2 is equivalent to the watch value of the second portion at order value 2 (4 is equivalent to 4), and the watch value of the first portion at order value 3 is nearly equivalent to the watch value of the second portion at order value 3 (0 is nearly equivalent to 1). In some implementations, processing logic determines that the order of play model is not effective if one order value has multiple watch values that are equivalent or nearly equivalent (e.g., more than 2 portions for a single order value have a watch value that is equivalent or nearly equivalent). For example, if the watch value of the first portion at order value 1 is 5 and the watch value of the second portion at order value 1 is 4, the order of play model can be found to not be effective regardless of the other watch values for the other portions at the order value, and regardless of the watch values for other order values. In other implementations, processing logic determines that the order of play model is not effective if a predefined number of order values have watch values that are equivalent or nearly equivalent (e.g., more than 2 order values have portions that have a watch value that is equivalent or nearly equivalent). Using the previous example, if the watch value of the first portion at order value 1 is 5 and the watch value of the second portion at order value 1 is 4, but the watch value for the first portion at order value 2 is 10 and the watch value for the second portion at order value 2 is 100, the order of play model can be found to be effective because only a single order value has watch values that are equivalent or nearly equivalent (order value 1).

In one implementation, if the first content model is a decision tree model, processing logic will determine that the decision tree model is effective for the digital content, because that is the most effective model possible for any digital content. In an alternate implementation, if the first content model is a decision tree model, and a predetermined number of probabilities for paths in the decision tree are equivalent or nearly equivalent, processing logic can determine that the order of play model is not effective for the digital content. For example, if the decision tree model includes a probability of 51% that the user will play portion 2 if the user plays portion 1 first and a probability of 49% that the user will play portion 3 if the user plays portion 1 first, processing logic can determine that the decision tree model is not effective for the digital content. In one implementation, the predetermined number of probabilities is 1. In alternate implementations, the predetermined number of probabilities is more than 1.

At block 815, processing logic selects another content model. In one implementation, processing logic selects another content model based on the first content model selected. In one implementation, if the first content model was a histogram model, processing logic selects an order of play model as the other content model. In an alternate implementation, if the first content model was a histogram model, processing logic selects a decision tree model as the other content model. In one implementation, if the first content model was an order of play model, processing logic selects a decision tree model. In an alternate implementation, if the first content model was an order of play model, processing logic selects a histogram model. In one implementation, if the first content model was a decision tree model, processing logic does not select another content model or processing logic selects the same decision tree model as the another content model. In an alternate implementation, if the first content model was a decision tree model, processing logic selects a histogram model as the other content model. In another alternate implementation, if the first content model was a decision tree model, processing logic selects an order of play model as the other content model.

In an alternate implementation, processing logic selects another content model based on the predefined event. In this implementation, if the predefined event occurs when a predefined threshold is reached, processing logic can select another content based on the predefined threshold. One implementation of selecting a content model based on a threshold is described below with reference to FIG. 10. In this implementation, if the predefined event occurs based on the access information for the first content model, processing logic can select the other model based on the access information provided by the other content models. One implementation of selecting a content model based on access information provided by the content models is described below with reference to FIG. 11.

Figure 9:
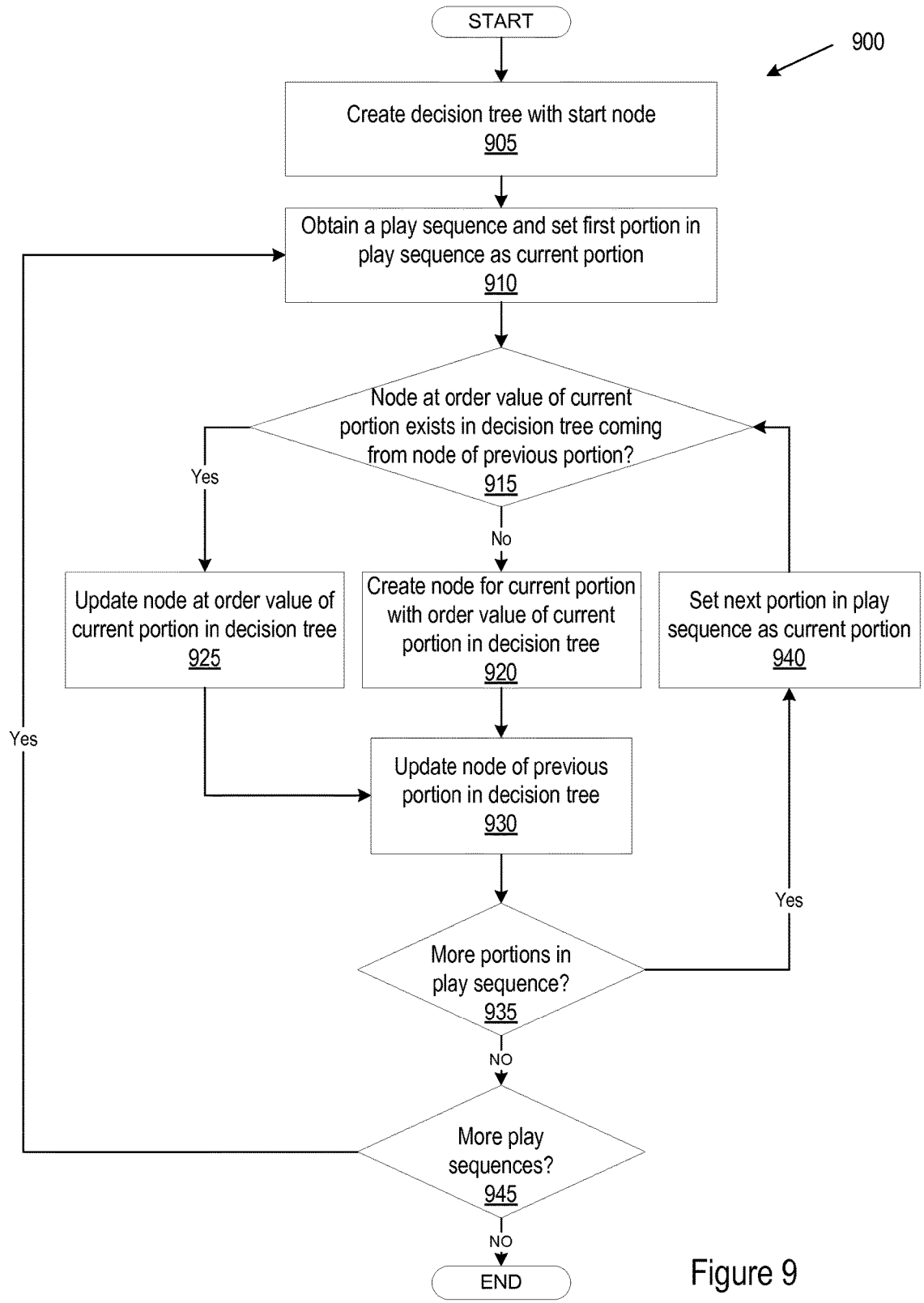
FIG. 9 is a flow diagram of one implementation for a method of generating a decision tree model.

FIG. 9 is a flow diagram of one implementation for a method of generating a decision tree model. The method 900 may be performed by processing logic that may include hardware (e.g., circuitry, dedicated logic, programmable logic, microcode, etc.), software (e.g., instructions run on a processing device to perform hardware simulation), or a combination thereof. In one implementation, the method 900 is performed by a server (e.g., the content server 110 of FIG. 1).

At block 905, processing logic creates a decision tree with a start node. In one implementation, the root node is a root node for the decision tree.

At block 910, processing logic obtains a play sequence and sets a first portion in the obtained play sequence as the current portion. In one implementation, processing logic can obtain the play sequence from a client or user device. In an alternate implementation, processing logic can obtain the play sequence from a content server. The play sequence can include one or more portions of digital content that were accessed by a user.

At block 915, processing logic can determine whether the node at the order value of the current portion exists in the decision tree coming from a node of the previous portion in the play sequence. Processing logic can determine whether the node at the order value of the current portion exists in the decision tree coming from a node of the previous portion in the play sequence by accessing the decision tree, determining the nodes in the decision tree with the order value of the current portion, comparing the portions associated with the determined nodes to the current portion, and if a portion associated with the determined nodes matches the current portion, comparing a portion associated with a node that leads to the determined node(s) to the previous portion in the play sequence.

Figure 17A:
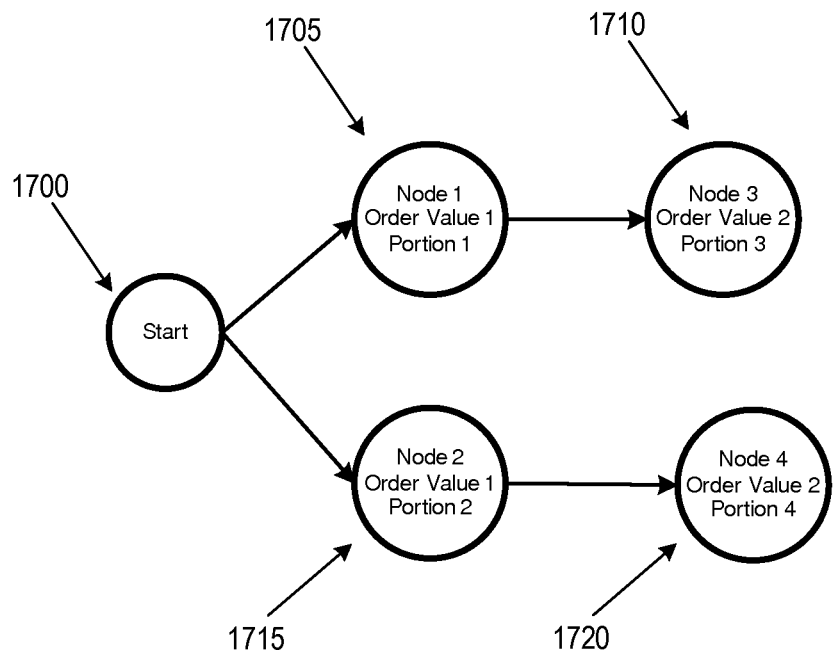
FIGS. 17A-17B are implementations of a decision tree model.

For example, FIG. 17A illustrates a decision tree 1700 that includes node 1 1705 at order value 1 and associated with portion 1, node 2 1710 at order value 1 and associated with portion 2, node 3 1715 at order value 2 and associated with portion 3 and coming from node 1, and node 4 1720 at order value 2 and associated with portion 4 and coming from node 2. If a current portion is portion 2 with order value 3, processing logic would access the decision tree 1700, and determine that no nodes exists for portion 2 with order value 3 because no nodes exist for order value 3. If a current portion is portion 2 with an order value 2, processing logic would access the decision tree 1700, determine that node 3 1715 and node 4 1720 exist at order value 2, compare the current portion (portion 2) with the portions associated with nodes 3 and 4 (portions 3 and 4), and determine that no node exists for portion 2 with order value 2. If a current portion is portion 3 with order value 2 and a previous portion 2, processing logic would access the decision tree 1700, determine that node 3 1715 and node 4 1720 exist at order value 2, compare the current portion (portion 3) with the portions associated with node 3 1715 and node 4 1720 (portions 3 and 4), determine that node 3 1715 exists for portion 3 with order value 2, and then compare the portion associated with a node that leads to the node 3 1715 (portion 1 associated with node 1 1705) to the previous portion in the play sequence (node 1 1705) to determine that the node at the order value of the current portion exists in the decision tree coming from a node of the previous portion in the play sequence by accessing the decision tree 1700.

Referring back to FIG. 9, if the node at the order value of the current portion exists in the decision tree coming from a node of the previous portion in the play sequence, the method 900 proceeds to block 925. If the node at the order value of the current position does not exist or if the node at the order value of the current portion does not come from a node of the previous portion in the play sequence, the method 900 proceeds to block 920.

Figure 17B:
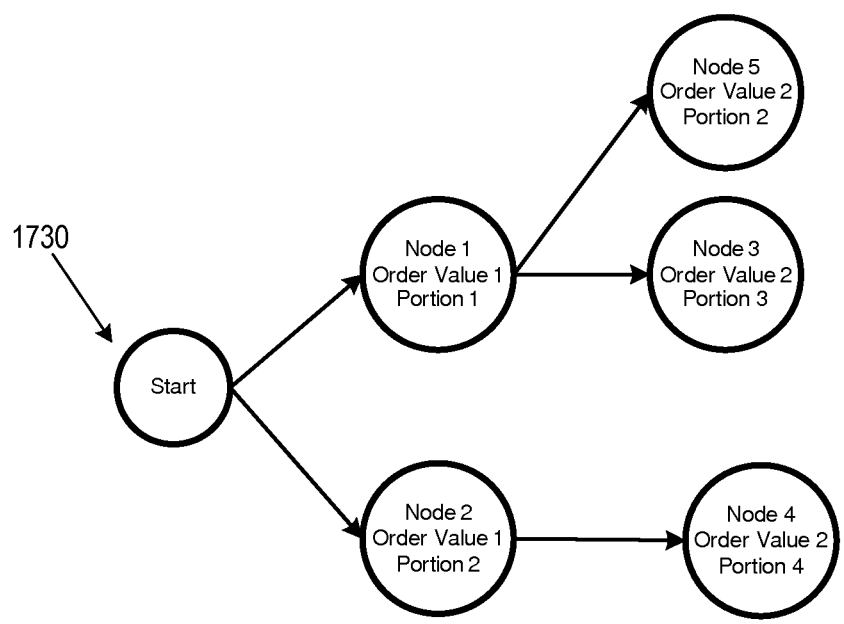

At block 920, processing logic creates a node for the current portion with the order value of the current portion and inserts the node into the decision tree at the order value. Processing logic can create the node by creating a new node, giving an identifier for the new node, associated an order value with the new node, associated a portion with the new node, and associating at least one previous node that leads to the new node. For example, FIG. 17B illustrates a decision tree 1730. Decision tree 1730 is an updated version of decision tree 1700 of FIG. 17A when processing logic determines that no node exists for portion 2 with order value 2 coming from node 1.

Referring back to FIG. 9, at block 925, processing logic updates the node at the order value of the current portion in the decision tree. Processing logic can update the node at the order value of the current portion in the decision tree by updating a watch value for the node (e.g., incrementing the watch value). For example, if a watch value for node 3 was previously 3, the watch value can be updated to be 4 because the current portion is in a play sequence, meaning that the current portion was accessed, or watched, in the play sequence.

In one implementation, processing logic can further update the node at the order value of the current portion in the decision tree by updating the characteristics for users of the node based on the user that accessed the digital content (and therefore generated the play sequence). The characteristics of the users of the node can include an age of the user, a geographic location of the user, historical information of how the user views digital content, etc. In one implementation, processing logic can update the characteristics for the user by including the user characteristic for the current portion in the node. For example, if characteristics of users of the node previously included that the node had information that users over 50 generally access the portion associated with the node, and the current portion was accessed by a user who was 18, the node can be updated to include the information that a user that was 18 accessed it. In an alternate implementation, processing logic can update the characteristics by updating a watch value that is associated with the user characteristic if the watch value exists, or creating a watch value for the user characteristic if the watch value does not exist. For example, if a watch value for users over 50 for the node was previously 10, and the current portion was accessed by a user who was 18, a new watch value can be created for users who are 18, or users who are under 50, and set to 1.

Figure 18A:
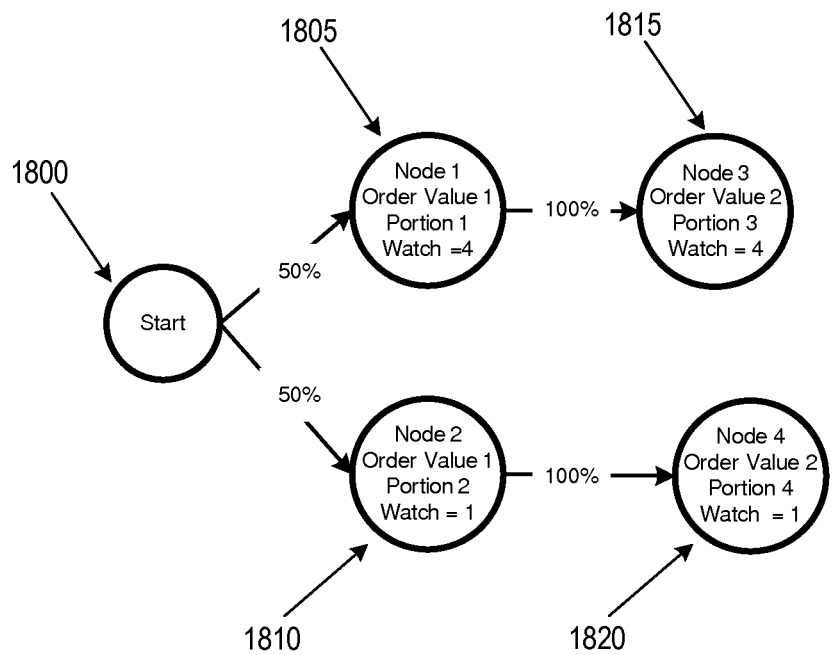
FIGS. 18A-18B are implementations of a decision tree mode including probabilities.
Figure 18B:
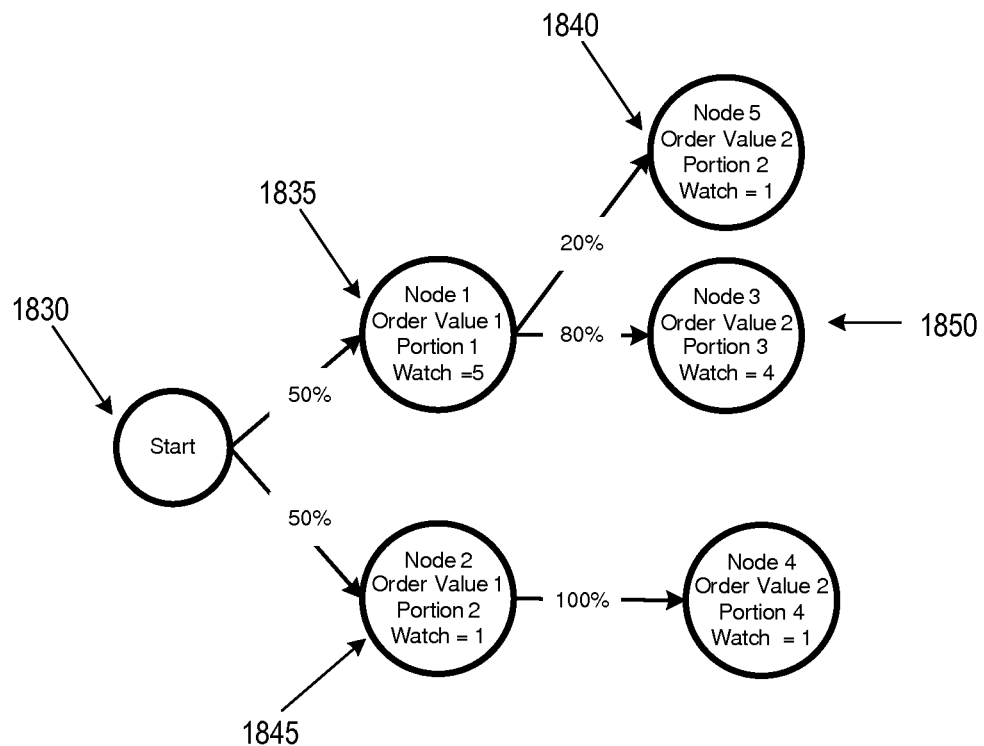

In one implementation, processing logic can further update the node at the order value of the current portion in the decision tree by updating other information for the node, such as a geographic location of the digital content, features of the digital content (e.g., a length of the digital content, a type of the digital content, etc.), a source that directed the user to the digital content. In one implementation, processing logic can update the other information in the node by updating the other information for the current portion in the node. For example, if other information of the node previously included that the digital content came from a server in California, and for the current portion, the digital content came from a server in New York, the node can be updated to include the information that the digital content came from New York. In an alternate implementation, processing logic can update the other information by updating a watch value that is associated with the other information if the watch value exists, or creating a watch value for the other information if the watch value does not exist. For example, if a watch value for the digital content coming from a server in California was previously 10, and the current portion came from a server in California, the watch value for the digital content coming from a server in California will be updated to 11. At block 930, processing logic can update the node associated with the previous portion in the decision tree. Processing logic can update the node of the previous portion by updating a probability associated with each path from the node of the previous portion to a next node. In one implementation, the probability associated with each path can represent a likelihood of going from the node to the next node based on access information for the nodes. In this implementation, the probability for each path can be calculated by performing an operation (e.g., dividing) a watch value for the next node in the path by the watch value for the node associated with the previous portion. For example, if a watch value for the next node in the path is 4, and a watch value for the node associated with the previous path is 5, then the probability for the path can be 4/5, or 80%. FIG. 18A illustrates a decision tree 1800 that indicates that there is a 50% chance that portion 1 1805 will be viewed first and a 50% chance that portion 2 1810 will be viewed first. Decision tree 1800 further illustrates that if portion 1 of node 1 1805 is viewed first, there is a 100% chance that portion 3 of node 3 1815 will be viewed second, and if portion 2 of node 2 1810 is viewed first, there is a 100% chance that portion 4 of node 4 1820 will be viewed second. If a new node is added to the decision tree based on a play sequence of the digital content, the decision tree can be updated as illustrated in FIG. 18B. Decision tree 1830 includes updated probabilities for all paths coming from the node of the previous portion in the decision tree (node 1 1835) based on the new node (node 5 1840). Decision tree 1830 illustrates that there is still a 50% chance that portion 1 of node 1 1835 will be viewed first and a 50% chance that portion 2 of node 2 1845 will be viewed first, but now if portion 1 of node 1 1835 is viewed first, there is a 80% chance that portion 3 of node 3 1850 will be viewed second and a 20% chance that portion 2 of node 5 1840 will be viewed second.

Referring back to FIG. 9, in an alternate implementation, the probability associated with each path can represent a likelihood of going from the node to the next node based on a characteristic of the user. In one implementation, the probability for each path can be calculated by performing an operation (e.g., dividing) each watch value for the next node in the path that is associated with the characteristic of the user by the overall watch value (e.g., sum of all watch values) for the node associated with the previous portion. Referring back to FIG. 18B, if node 3 1850 included a watch value of 2 for users over 50, a watch value of 1 for users under 18, and a watch value of 1 for users between 18 and 50, 3 probabilities are calculated, one for each watch value of the next node. In this example, the path from node 1 1835 to node 3 1850 are: 40% if the user is over 50, 20% if the user is under 18, and 20% if the user is between 18 and 50. Referring back to FIG. 9, in an alternate implementation, the probability for each path can be calculated by performing an operation (e.g., dividing) each watch value for the next node in the path that is associated with the characteristic of the user by the watch value for the node associated with the previous portion that is associated with the characteristic of the user. For example, referring back to FIG. 18B, if node 3 1850 included a watch value of 2 for users over 50, a watch value of 1 for users under 18, and a watch value of 1 for users between 18 and 50, and node 1 1835 includes a watch value of 3 for users over 50, a watch value of 1 for users under 18, and a watch value of 1 for users between 18 and 50, 3 probabilities are calculated, one for each watch value of the next node. In this example, the path from node 1 1835 to node 3 1850 for users over 50 is 66%, 100% if the user is over 50, and 100% if the user is between 18 and 50.

Referring back to FIG. 9, in another alternate implementation, the probability associated with each path can represent a likelihood of going from the node to the next node based on other information. In this implementation, the probability for each path can be calculated by performing an operation (e.g., dividing) each watch value for the next node in the path that is associated with the other information by the overall watch value (e.g., sum of all watch values) for the node associated with the previous portion. For example, referring back to FIG. 18B, if node 3 1850 included a watch value of 3 for digital content coming from California and a watch value of 1 for digital content coming from New York, 2 probabilities are calculated, one for each watch value of the next node. In this example, the paths from node 1 1835 to node 3 1850 are: 75% if the digital content came from California and 25% if the digital content came from New York. Referring back to FIG. 9, in an alternate implementation, the probability for each path can be calculated by performing an operation (e.g., dividing) each watch value for the next node in the path that is associated with the other information by the watch value for the node associated with the previous portion that is associated with the previous information. For example, referring back to FIG. 18B, if node 3 1850 included a watch value of 3 for digital content coming from California and a watch value of 1 for digital content coming from New York, and node 1 1835 included a watch value of 3 for digital content coming from California and a watch value of 1 for digital content coming from New York, 2 probabilities are calculated, one for each watch value of the next node. In this example, the paths from node 1 1835 to node 3 1850 are: 100% if the digital content came from California and 100% if the digital content came from New York.

Referring back to FIG. 9, at block 935, processing logic determines whether there are more portions in the play sequence. If there are no more portions in the play sequence, the method 900 proceeds to block 945. If there are more portions in the play sequence, the method 900 proceeds to block 940.

At block 940, processing logic sets the next portion in the play sequence as the current portion, and proceeds to block 915 to determine whether a node at the order value of the current portion exists in the decision tree coming from the node of the previous portion in the play sequence.

At block 945, processing logic determines if there are more play sequences to analyze in generating the decision tree. If there are more play sequences, the method 900 returns to block 910 to obtain the next play sequence and update the decision tree based on the next play sequence. If there are no more play sequences, the method 900 ends.

Figure 10:
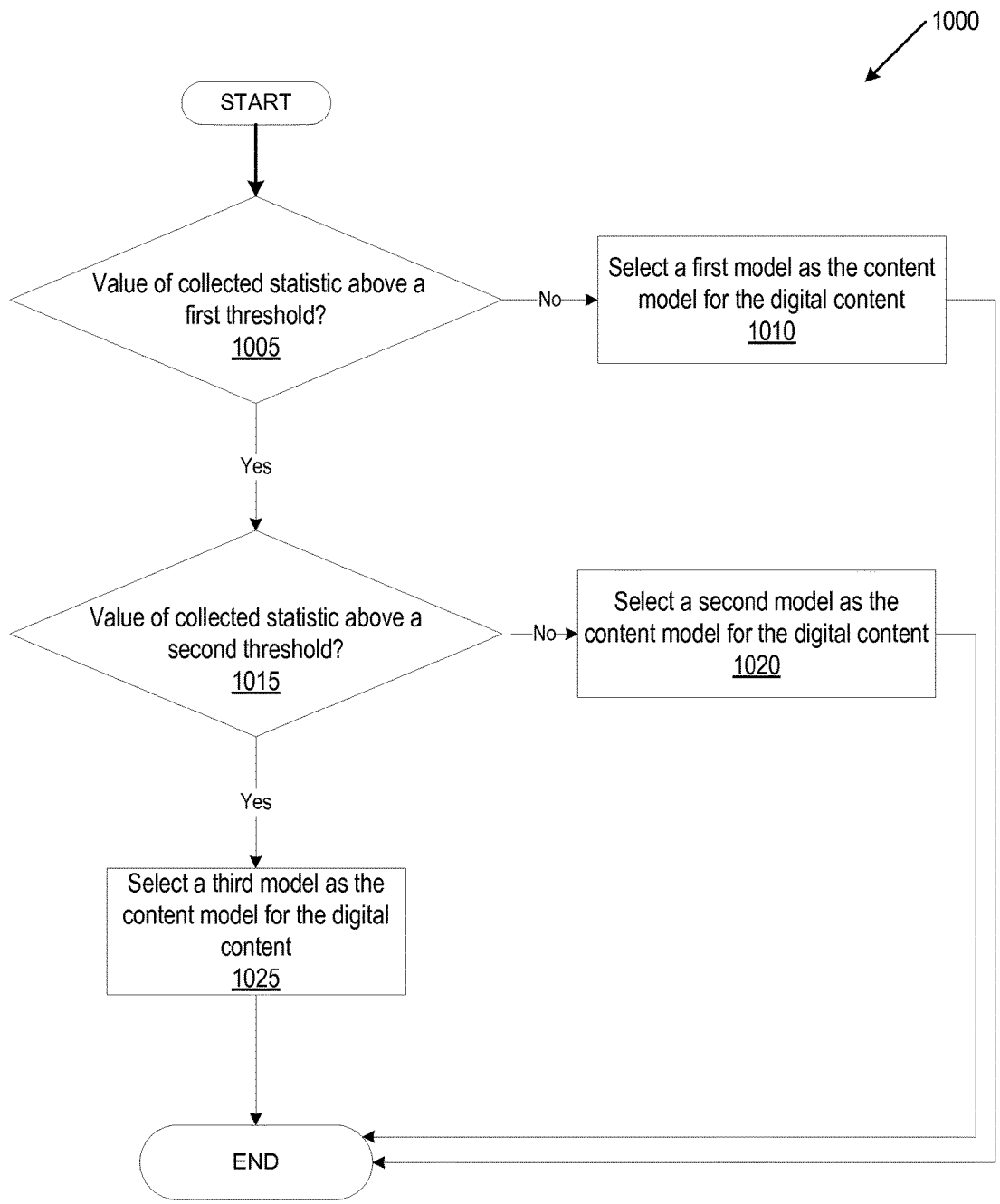
FIG. 10 is a flow diagram of one implementation for a method of selecting a content model based on a threshold.

FIG. 10 is a flow diagram of one implementation for a method of selecting a content model based on a threshold. The method 1000 may be performed by processing logic that may include hardware (e.g., circuitry, dedicated logic, programmable logic, microcode, etc.), software (e.g., instructions run on a processing device to perform hardware simulation), or a combination thereof. In one implementation, the method 1000 is performed by a server (e.g., the content server 110 of FIG. 1). In an alternate implementation, the method 1000 is performed by a client or user device (e.g., the client/user device 105 of FIG. 1).

At block 1005, processing logic determines whether the value of a collected statistic is above a first threshold. The collected statistic is a statistic that can be collected and associated with digital content, such as a number of times the digital content has been requested, a number of times the digital content has been viewed, a number of times the digital content has been accessed, a number of different users to access or view the digital content, a feature of the digital content, etc. The value of the first threshold can be defined by a system administrator, a user, a digital content provider, etc. For example, the first threshold can be 1,000 views for the digital content. If the collected statistic is above a first threshold, the method 1000 proceeds to block 1015. If the collected statistic is not above a first threshold, the method 1000 proceeds to block 1010.

At block 1010, processing logic selects a first model as the content model for the digital content. In one implementation, the first model is a histogram model. The histogram model is the simplest model to generate, and also requires the least amount of computation and resources. Therefore, if the collected statistic indicates that the digital content is not very popular (because it has not been accessed, viewed, requested many times, few different users are accessing it, etc.), it may not be worthwhile for processing logic to select a model that requires a lot of resources to be generated, such as more complex models for the digital content. In an alternate implementation, processing logic the first model is an order of play model. The order of play model can be fairly simple to generate, does not require as much computation and resources as a decision tree model, and can possibly generate a more accurate sequence of portions of the digital content to obtain because it takes into account the order in which the digital content is accessed. Therefore, even if the collected statistic indicates that the digital content is not very popular, processing logic may still determine that it is worthwhile to use a few extra resources to generate the order of play model because a sequence generated using an order of play model may be more accurate than a histogram model.

At block 1015, processing logic determines if the value of the collected statistic is above a second threshold. The value of the second threshold can be a defined by a system administrator, a user, a digital content provider, etc. The value of the second threshold can be higher than the value of the first threshold, and can indicate that the digital content is becoming more popular. For example, the second threshold can be that the number of views for the digital content is 100,000 views, indicating that the digital content is a popular digital content to view. If the collected statistic is above a second threshold, the method 1000 proceeds to block 1025. If the collected statistic is not above a second threshold, the method 1000 proceeds to block 1020.

At block 1020, processing logic selects a second model as the content model for the digital content. In one implementation, the second model is an order of play model. The order of play model can be fairly simple for processing logic to generate, does not require as much computation or as many resources as a decision tree model, and can generate an accurate sequence of portions of the digital content to obtain because it takes into account the order in which the digital content is accessed. Therefore, as the collected statistic indicates that the digital content is becoming popular, the processing logic can select the order of play model to improve the accuracy of the sequence of portions of the digital content to obtain.

At block 1025, processing logic selects a third model as the content model. In one implementation, the third model is a decision tree model. If the value of the collected statistic is above a second threshold, the digital content can be considered quite popular, with many views, accesses, or different users. As such, the information associated with the digital content can be used to generate an accurate model that can generate a sequence of portions to obtain using a most likely path based on the information.

Figure 11:
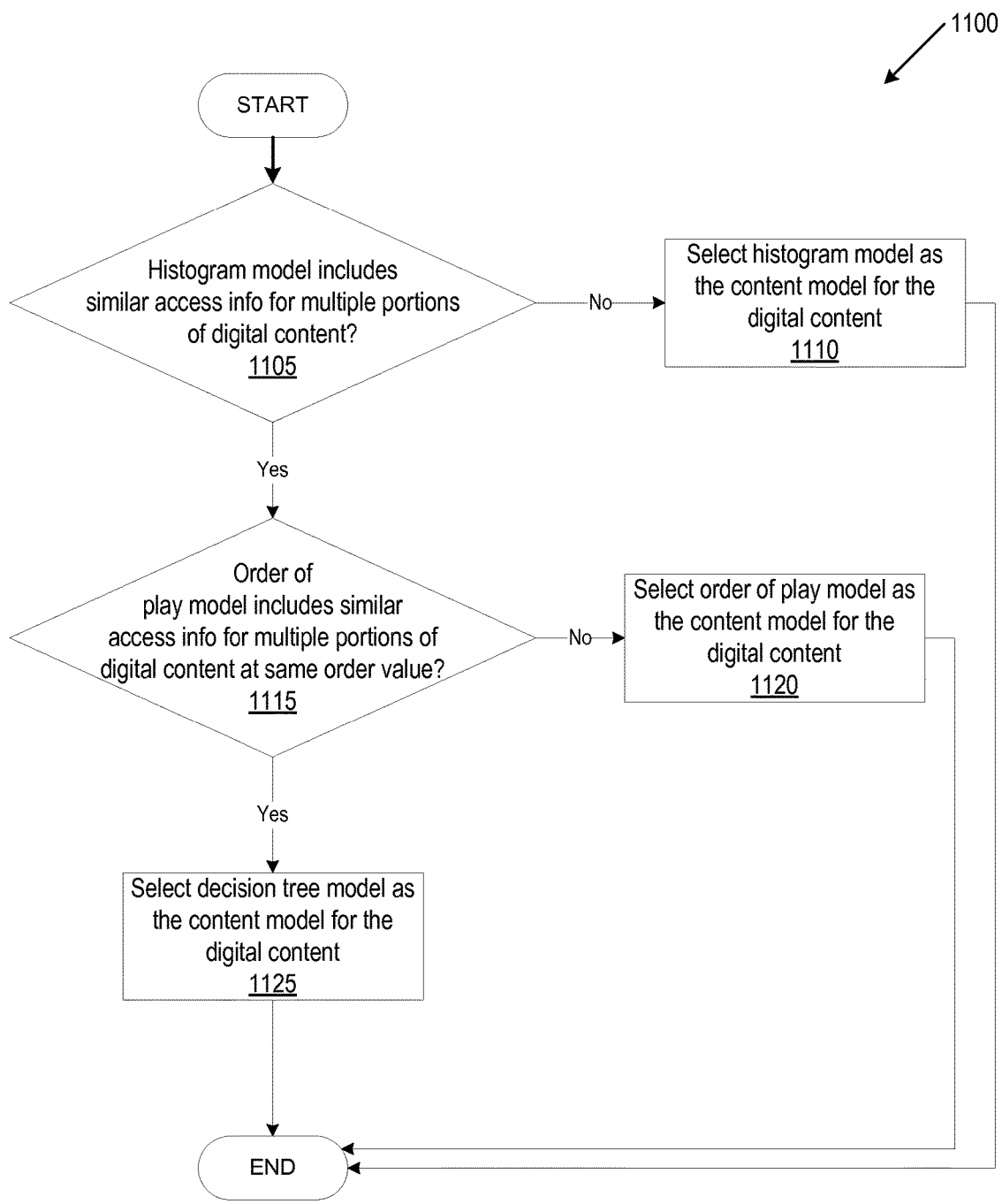
FIG. 11 is a flow diagram of one implementation for a method of selecting a content model based on access information.

FIG. 11 is a flow diagram of one implementation for a method of selecting a model based on access data. The method 1100 may be performed by processing logic that may include hardware (e.g., circuitry, dedicated logic, programmable logic, microcode, etc.), software (e.g., instructions run on a processing device to perform hardware simulation), or a combination thereof. In one implementation, the method 1100 is performed by a server (e.g., the content server 110 of FIG. 1). In an alternate implementation, the method 1100 is performed by a client or user device (e.g., the client/user device 105 of FIG. 1).

At block 1105, processing logic determines if a histogram model for the digital content includes similar access information for multiple portions of the digital content. In one implementation, the access information is a watch value for each portion in the histogram model. In an alternate implementation, the access information is a percentage value for each portion in the histogram model. Processing logic determines that the histogram model for the digital content includes similar access information for multiple portions of the digital content by comparing the access information for the multiple portions and determining whether any of the portions have access information in the histogram model that is equivalent or nearly equivalent to the access information in the histogram model for other portions. For example, the digital content has 3 portions and the histogram model includes access information: watch value of the first portion is 10, watch value of the second portion is 8, and the watch value of the third portion is 100. The first portion and the second portion may have similar access information since the watch value of 10 for the first portion is nearly equivalent to the watch value of 8 for the second portion. If any of the portions have access information in the histogram model that is equivalent or nearly equivalent to the access information in the histogram model for other portions, processing logic can determine that the histogram model includes similar access information for multiple portions of the digital content, and the method 1100 proceeds to block 1115. If none of the portions have access information in the histogram model that is equivalent or nearly equivalent to the access information in the histogram model for other portions, processing logic can determine that the histogram model does not include similar access information for multiple portions of the digital content, and the method 1100 proceeds to block 1110.

At block 1110, processing logic selects the histogram model as the content model for the digital content. The histogram model is the simplest model to generate, and also requires the least amount of computation and resources. Therefore, if the histogram model does not include similar access information for multiple portions of the digital content, which can indicate that the digital content is not very popular (because it has not been accessed, viewed, requested many times, few different users are accessing it, etc.) or that the portions are being accessed in a similar way during access of the digital content, it may not be worthwhile for processing logic to select a model that requires a lot of resources to be generated, such as the more complex order of play and decision tree models.

At block 1115, processing logic determines whether an order of play model includes similar access information for multiple portions of the digital content at a same order value. In one implementation, the access information is a watch value for each portion at an order value in the order of play model. In an alternate implementation, the access information is a percentage value for each portion at an order value in the order of play model. Processing logic determines that the order of play model for the digital content includes similar access information for multiple portions of the digital content at a same order value by comparing the access information for the multiple portions at the order value and determining whether any of the portions at the order value have access information in the order of play model that is equivalent or nearly equivalent to the access information in the histogram model for other portions at the order value. For example, the digital content has 3 portions and the order of play model includes access information: watch value of the first portion at order value 1 is 5, watch value of the first portion at order value 2 is 4, watch value of the first portion at order value 3 is 0, watch value of the second portion at order value 1 is 1, watch value of the second portion at order value 2 is 4, watch value of the second portion at order value 3 is 1, watch value of the third portion at order value 1 is 3, watch value of the third portion at order value 2 is 0, watch value of the third portion at order value 3 is 10. The order of play model may be found to have multiple portions at the order value that are equivalent or nearly equivalent because the watch value of the first portion at order value 1 is nearly equivalent to the watch value of the third portion at order value 1 (5 is nearly equivalent to 3), the watch value of the first portion at order value 2 is equivalent to the watch value of the second portion at order value 2 (4 is equivalent to 4), and the watch value of the first portion at order value 3 is nearly equivalent to the watch value of the second portion at order value 3 (0 is nearly equivalent to 1).

In some implementations, processing logic determines an order of play model includes similar access information for multiple portions of the digital content at a same order value if one order value has multiple watch values that are equivalent or nearly equivalent (e.g., more than 2 portions for a single order value have a watch value that is equivalent or nearly equivalent). For example, if the watch value of the first portion at order value 1 is 5 and the watch value of the second portion at order value 1 is 4, the processing logic can determine that an order of play model includes similar access information regardless of the other watch values for the other portions at the order value, and regardless of the watch values for other order values. In other implementations, processing logic can determine that an order of play model includes similar access information if a predefined number of order values have watch values that are equivalent or nearly equivalent (e.g., more than 2 order values have portions that have a watch value that is equivalent or nearly equivalent). Using the previous example, if the watch value of the first portion at order value 1 is 5 and the watch value of the second portion at order value 1 is 4, but the watch value for the first portion at order value 2 is 10 and the watch value for the second portion at order value 2 is 100, processing logic can determine that an order of play model does not include similar access information because only a single order value has watch values that are equivalent or nearly equivalent (order value 1).

If any of the portions at the order value have access information in the order of play model that is equivalent or nearly equivalent to the access information in the histogram model for other portions at the order value, processing logic can determine that the order of play model includes similar access information for multiple portions of the digital content at the same order value, and the method 1100 proceeds to block 1125. If none or some of the portions at the order value have access information in the order of play model that is equivalent or nearly equivalent to the access information in the order of play model for other portions at the same order value, processing logic can determine that the order of play model does not include similar access information for multiple portions of the digital content at the same order value, and the method 1100 proceeds to block 1120.

At block 1120, processing logic selects an order of play model as the content mode for the digital content 1. The order of play model can be fairly simple to generate, does not require as much computation and resources as a decision tree model, and can possibly generate a more accurate sequence of portions of the digital content to obtain than a histogram model because it takes into account the order in which the digital content is accessed.

At block 1125, processing logic selects a decision tree model as the content model for the digital content. If both the histogram model and the order of play model include similar access information for multiple portions of the digital content, then the decision tree model can be selected to generate the most accurate model possible for the digital content.

Figure 12:
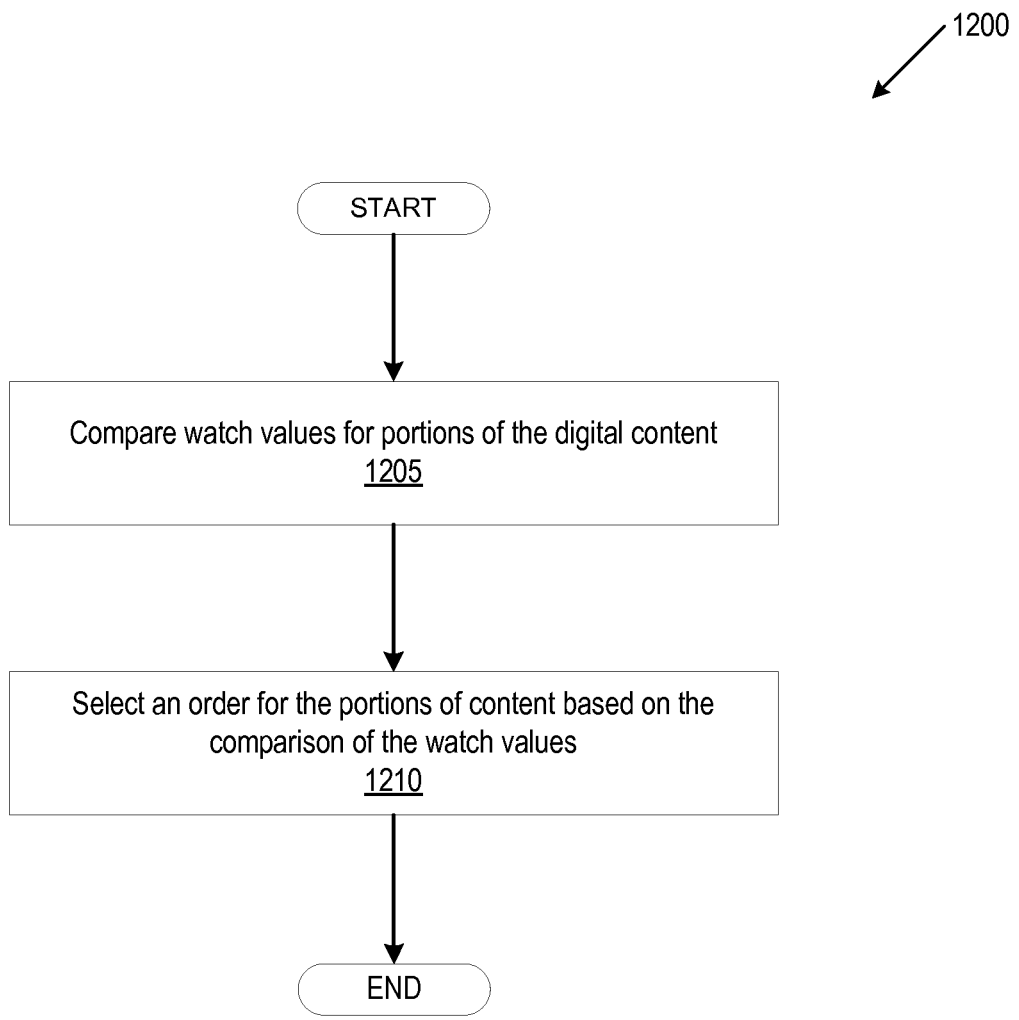
FIG. 12 is a flow diagram of one implementation for a method of generating an ordering based on a histogram model.

FIG. 12 is a flow diagram of one implementation for a method of ordering digital content based on a histogram content model. The method 1200 may be performed by processing logic that may include hardware (e.g., circuitry, dedicated logic, programmable logic, microcode, etc.), software (e.g., instructions run on a processing device to perform hardware simulation), or a combination thereof. In one implementation, the method 1200 is performed by a server (e.g., the content server 110 of FIG. 1). In an alternate implementation, the method 1200 is performed by a client or user device (e.g., the client/user device 105 of FIG. 1).

At block 1205, processing logic compares watch values for portions of digital content. The watch value for each portion can represent a number of times that the corresponding portion of digital content has been accessed or viewed.

At block 1210, processing logic selects an order for the portions of the digital content based on the comparison of the watch values. In one implementation, processing logic selects the order in a descending order of the watch values, from the portion with the largest watch value to the portion with the smallest watch value. For example, if digital content has portion 1 with a watch value of 4, portion 2 with a watch value of 2, and portion 3 with a watch value of 3, the selected order is: portion 1, portion 3, and portion 2. In an alternate implementation, processing logic selects the order in an ascending order of the watch values, from the portion with the smallest watch value to the portion with the largest watch value.

In one implementation, if two or more of the portions have watch values that are equivalent or nearly equivalent, processing logic can randomly select the order for those portions. Two or more of the portions can have watch values that are equivalent if the watch values are the exact same value. Two or more of the portions can have watch values that are nearly equivalent if the watch values are within a certain number of each other (e.g., one more, one less, etc.), within a certain percentage (e.g., within 10% of each other, etc.). For example, if digital content has portion 1 with a watch value of 4, portion 2 with a watch value of 2, and portion 3 with a watch value of 4, the selected order can be: portion 1, portion 3, portion 2 or portion 3, portion 1, portion.

In an alternate implementation, if two or more of the portions have watch values that equivalent or nearly equivalent, processing logic can select the portion that is closer in time to the previous portion in the order. For example, if digital content has portion 1 with a watch value of 6, portion 2 with a watch value of 4, and portion 3 with a watch value of 4, the selected order is: portion 1, portion 2, and portion 3 because portion 2 is closer in time to portion 1 than portion 3 is to portion 1.

In another alternate implementation, if two or more of the portions have watch values that equivalent or nearly equivalent, processing logic can select the portion that is closer in time to the next portion with a different watch value in the order. For example, if digital content has portion 1 with a watch value of 6, portion 2 with a watch value of 4, portion 3 with a watch value of 4, and portion 4 with a watch value of 2, the selected order is: portion 1, portion 2, portion 3, and portion 4 because portion 3 is closer in time to portion 4 (which is the next portion with a different watch value) than portion 2 is to portion 4.

In yet another alternate implementation, if two or more of the portions have watch values that are equivalent or nearly equivalent, processing logic can select alternate subsets of the portions that have the same watch value to put in the order. In one implementation, processing logic can select the subset of the portions by dividing each portion into an equal number, such as 3 subsets. In an alternate implementation, processing logic can select each subset to be a number of frames, such as 10 frames. For example, if digital content has portion 1 with a watch value of 6, portion 2 with a watch value of 4, portion 3 with a watch value of 34, and portion 4 with a watch value of 2, the selected order is: portion 1, first subset of portion 2, first subset of portion 3, second subset of portion 2, second subset of portion 3, last subset of portion 2, last subset of portion 3, portion 4.

Figure 13:
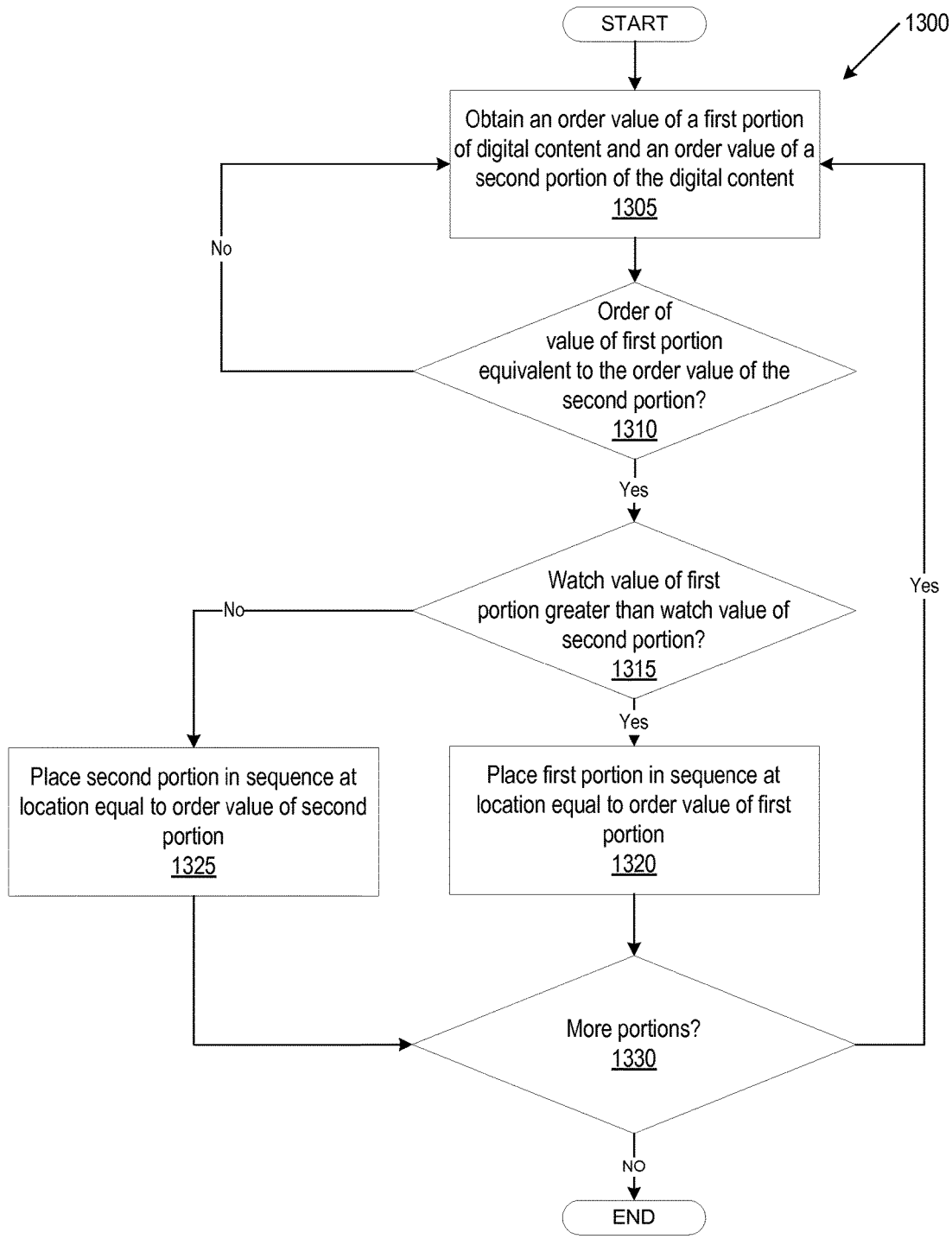
FIG. 13 is a flow diagram of one implementation for a method of generating an ordering based on an order of play model.

FIG. 13 is a flow diagram of one implementation for a method of ordering digital content based on an order of play content model. The method 1300 may be performed by processing logic that may include hardware (e.g., circuitry, dedicated logic, programmable logic, microcode, etc.), software (e.g., instructions run on a processing device to perform hardware simulation), or a combination thereof. In one implementation, the method 1300 is performed by a server (e.g., the content server 110 of FIG. 1). In an alternate implementation, the method 1300 is performed by a client or user device (e.g., the client/user device 105 of FIG. 1).

At block 1305, processing logic obtains an order value of a first portion of digital content and an order value of a second portion of digital content. The order value of a portion of digital content can represent the location in a play sequence that the portion was played. For example, if a play sequence for digital content was: portion 1, portion 2, and portion 3, then the order value for portion 1 is 1 since it was played first, the order value for portion 2 is 2 since it was played second, and the order value of portion 3 is 3 since it was played third. Processing logic can obtain the order value of the first portion of digital content and the order value of the second portion of the digital content from an order of play model.

At block 1310, processing logic compares the order value of the first portion of digital content to the order value of the second portion of the digital content. For example, if portion 1 has an order value of 2 and portion 2 has an order value of 2, the order values of the first portion and the second portion are equivalent. If processing logic determines that the order value of the first portion is not equivalent to the order value of the second portion, the method 1300 returns to processing block 1305 to obtain an order value of another first portion of digital content and an order value of another second portion of digital content. If processing logic determines that the order value of the first portion is equivalent to the order value of the second portion, the method 1300 proceeds to block 1315.

At block 1315, processing logic determines whether the watch value of the first portion is greater than the watch value of the second portion. Processing logic can determine whether the watch value of the first portion is greater than the watch value of the second portion by comparing the watch values. For example, if the watch value of the first portion is 5 and the watch value of the second portion is 3, the watch value of the first portion is greater than the watch value of the second portion. If the watch value of the first portion is not greater than the watch value of the second portion, the method 1300 proceeds to block 1325. If the watch value of the first portion is greater than the watch value of the second portion, the method 1300 proceeds to block 1320.

At block 1320, processing logic places the first portion in a sequence at the location in the sequence that is equal to the order value of the first portion. For example, if the first portion has an order value of 1, then the first portion will be placed first in the sequence for the digital content.

At block 1325, processing logic places the second portion in a sequence at the location in the sequence that is equal to the order value of the second portion. For example, if the second portion has an order value of 10, then the second portion will be placed tenth in the sequence for the digital content.

Prior to placing the second portion in the sequence at the location in the sequence that is equal to the order value of the second portion, processing logic can determine whether the watch value of the first portion is equivalent or nearly equivalent to the watch value of the second portion. In one implementation, if the watch value of the first portion is equivalent or nearly equivalent to the watch value of the second portion, processing logic can randomly select whether to put the first portion or the second portion in the sequence at the location in the sequence that is equal to the order value of the first portion or second portion. The first portion and second portion can have watch values that are equivalent if the watch values are the exact same value. The first portion and second portion can have watch values that are nearly equivalent if the watch values are within a certain number of each other (e.g., one more, one less, etc.), within a certain percentage (e.g., within 10% of each other, etc.). In an alternate implementation, if the first portion and the second portion have watch values that are equivalent or nearly equivalent, processing logic can select the first portion or the second to put in the sequence at the location in the sequence that is equal to the order value of the first portion or second portion based on which portion is closer in time to the previous portion in the order. In another alternate implementation, if the first portion and the second portion have watch values that equivalent or nearly equivalent, processing logic can select the first portion or the second to put in the sequence at the location in the sequence that is equal to the order value of the first portion or second portion based on which portion is closer to the next portion in the sequence. In yet another alternate implementation, if the first portion and the second portion have watch values that are equivalent or nearly equivalent, processing logic can select alternate subsets of the portions to put in the sequence. In one implementation, processing logic can select the subset of the portions by dividing each portion into an equal number, such as 3 subsets. In an alternate implementation, processing logic can select each subset to be a number of frames, such as 10 frames.

At block 1330, processing logic determines if there are more portions to place in the sequence. If there are more portions, the method 1300 returns to block 1305. If there are no more portions, the method 1300 ends.

Figure 14:
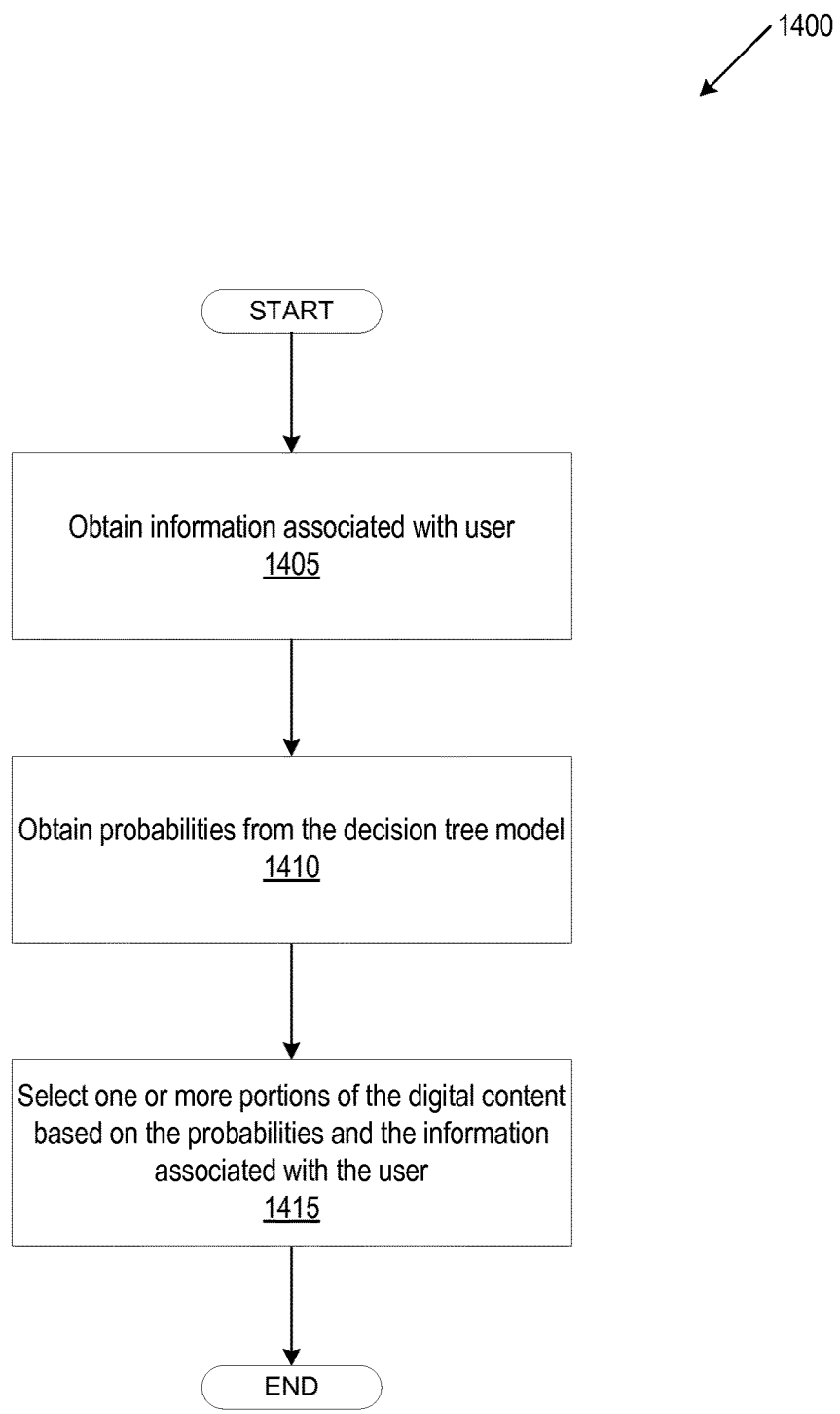
FIG. 14 is a flow diagram of one implementation for a method of generating an ordering based on a decision tree model using information associated with a user.

FIG. 14 is a flow diagram of one implementation for a method of ordering digital content based on a decision tree content model using user information. The method 1400 may be performed by processing logic that may include hardware (e.g., circuitry, dedicated logic, programmable logic, microcode, etc.), software (e.g., instructions run on a processing device to perform hardware simulation), or a combination thereof. In one implementation, the method 1400 is performed by a server (e.g., the content server 110 of FIG. 1). In an alternate implementation, the method 1400 is performed by a client or user device (e.g., the client/user device 105 of FIG. 1).

At block 1405, processing logic can obtain information associated with a user viewing digital content for which an order is to be determined. The information associated with the user can include characteristics of the users, such as an age of the user, a geographic location of the user, historical information of how the user views digital content, etc. In one implementation, processing logic obtains the information associated with the user from a content hosting website. In an alternate implementation, processing logic obtains the information associated with the user from a storage device.

At block 1410, processing logic can obtain probabilities from the decision tree model. The probabilities can represent a likelihood of going from one node in the decision tree to the next node in the decision tree for a particular characteristic.

At block 1415, processing logic can select one or more portions of the digital content based on the probabilities and the information associated with the user. Processing logic can select each portion by accessing a node in the decision tree model, comparing the information associated with the user with the information associated with probabilities in the node, selecting a next node in the decision tree based on the comparison, and including the portion represented by the node in a sequence for the digital content.

Figure 19:
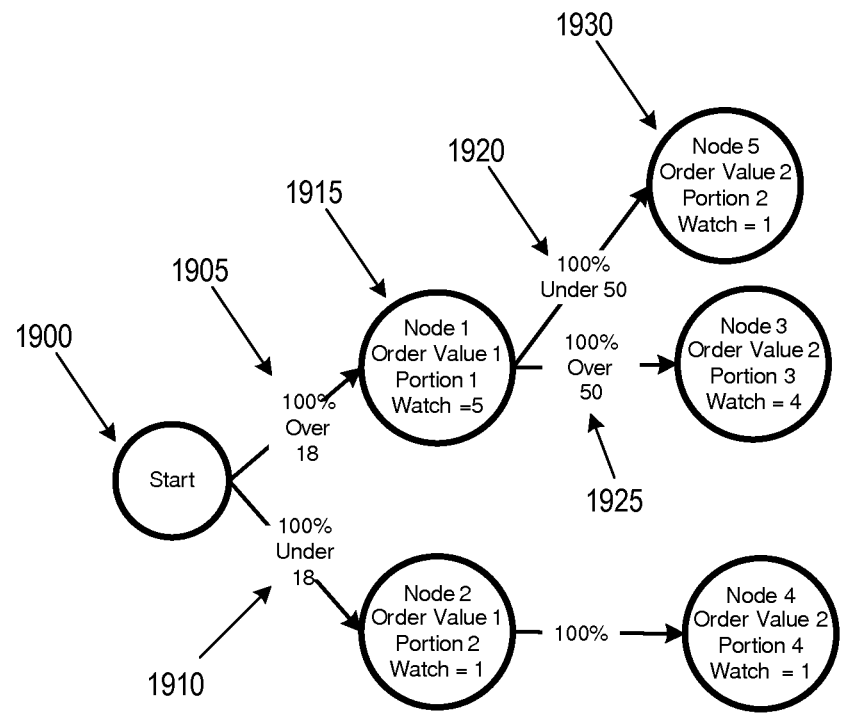
FIG. 19 is one implementation of a decision tree model including probabilities and information.

Referring to FIG. 19, a decision tree 1900 is illustrated for digital content. and a user accessing the digital content is a user that is 35 years old. At the start of the digital content being played, processing logic compares the information for each of the 2 probabilities 1905 and 1910. Probability 1905 represents a probability for users over 18 and probability 1910 represents a probability for users under 18. Because the user is 35, node 1 1915 will be selected because that is the only node that users who are over 18 have historically selected when starting the content. Next, processing logic compares the information for the probabilities leading from node 1, which is a probability 1920 for users over 50 and a probability 1925 for users under 50. Because the user is 35, node 5 1930 will be selected because that is the only node that users who are under 50 have historically selected coming from node 1 1915. Therefore, the sequence generated for the digital content in the above example will be: portion 1, portion 2.

Referring back to FIG. 14, if multiple probabilities in the node match the information associated with the user, then processing logic can select the next node by selecting the larger probability value. For example, information for a user is that the user is 46 and a decision tree model has a probability of 50% of going from node 1 to node 2 for users under 50, and a probability of 25% of going from node 1 to node 3 for users under 50. In this example, processing logic will determine that both the probability of 50% and the probability of 25% match the information for the user, since both probabilities are for users under 50. Processing logic will then compare the probability values of 50 and 25, and select node 2 for the user after node 1.

In one implementation, if multiple probabilities in the node match the information associated with the user and two or more of the probabilities are compared and are equivalent or nearly equivalent, processing logic can randomly select the next node in the sequence. The multiple probabilities in the node can be equivalent if the watch values are the exact same value. The multiple probabilities in the node can be nearly equivalent if the probabilities are within a certain number of each other (e.g., one more, one less, etc.), within a certain percentage (e.g., within 10% of each other, etc.). In an alternate implementation, if multiple probabilities in the node match the information associated with the user and two or more of the probabilities are compared and are equivalent or nearly equivalent, processing logic can select the next node based on which portion represented by the next node is closer in time to the previous portion. In another alternate implementation, if multiple probabilities in the node match the information associated with the user and two or more of the probabilities are compared and are equivalent or nearly equivalent, processing logic can select alternate subsets of the portions to put in the sequence. In one implementation, processing logic can select the subset of the portions by dividing each portion into an equal number, such as 3 subsets. In an alternate implementation, processing logic can select each subset to be a number of frames, such as 10 frames.

Figure 15:
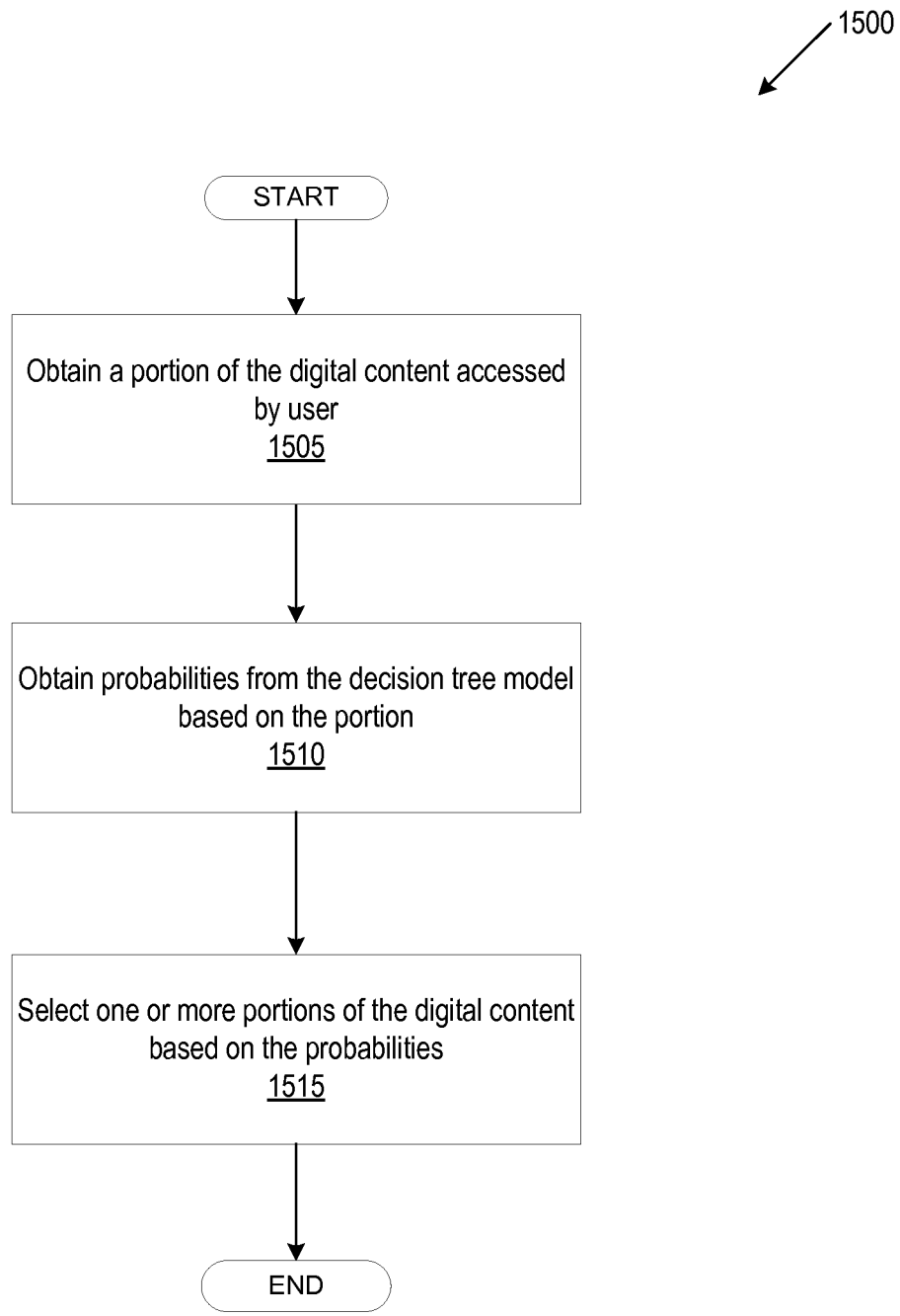
FIG. 15 is a flow diagram of one implementation for a method of generating an ordering based on a decision tree model using a previous action.

FIG. 15 is a flow diagram of one implementation for a method of ordering digital content based on a decision tree content model using a previous action. The method 1500 may be performed by processing logic that may include hardware (e.g., circuitry, dedicated logic, programmable logic, microcode, etc.), software (e.g., instructions run on a processing device to perform hardware simulation), or a combination thereof. In one implementation, the method 1500 is performed by a server (e.g., the content server 110 of FIG. 1). In an alternate implementation, the method 1500 is performed by a client or user device (e.g., the client/user device 105 of FIG. 1).

At block 1505, processing logic can obtain a portion of the digital content accessed by a user. In one implementation, the portion of the digital content is the first portion of the digital content played by a user. In an alternate implementation, the portion of the digital content is the previous portion (e.g., most recent) of the digital content accessed by the user.

At block 1510, processing logic can obtain probabilities from the decision tree model based on the portion accessed. The probabilities can represent a likelihood of going from one node in the decision tree to the next node in the decision tree based on historical play sequences for the digital content. If the portion of the digital content is the first portion of the digital content played by the user, processing logic can obtain the probabilities from the first node of the decision tree. In one implementation, if the portion of the digital content is a previous portion of the digital content accessed by the user, processing logic obtains the probabilities from the first node of the decision tree. In an alternate implementation, if the portion of the digital content is a previous portion of the digital content, processing logic can obtain the probabilities from a node in the decision tree that was previously accessed.

At block 1515, processing logic can select one or more portions of the digital content based on the probabilities. Processing logic can select each portion by comparing the obtained probabilities, selecting a next node in the decision tree based on the comparison, and including the portion represented by the selected node in a sequence for the digital content. Once processing logic has selected a next node, processing logic can continue to select nodes (and the corresponding portions) in the decision tree based on probabilities. Therefore, in some implementations, processing logic can traverse the entire decision tree once the user has accessed a single portion of the digital content. In other implementations, processing logic can select a subset of portions of the digital content (e.g., a predetermined number of portions) using the decision tree, and then wait for the user to access another portion of the digital content prior to selection additional portions.

Figure 20:
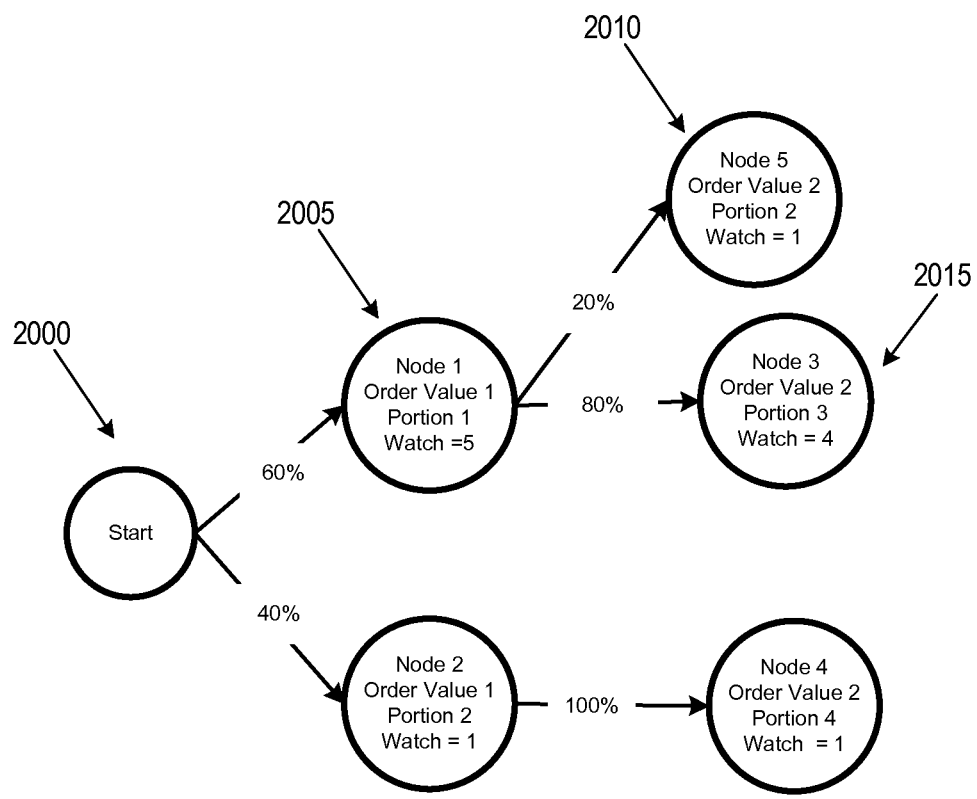
FIG. 20 is one implementation of a decision tree model used to select a next portion of digital content.

For example, FIG. 20 illustrates a decision tree model 2000 for a digital content. In one example, the user accesses portion 1. Processing logic obtains the probabilities leading from node 1 2005, which is a 20% probability that node 5 2010 will be accessed next and an 80% probability that node 3 2015 will be accessed next. Because the probability that the user will access portion 3 after portion 1 is greater than the probability that the user will access portion 5 after portion 1, processing logic will select portion 3 (and therefore node 3 2015).

Figure 16:
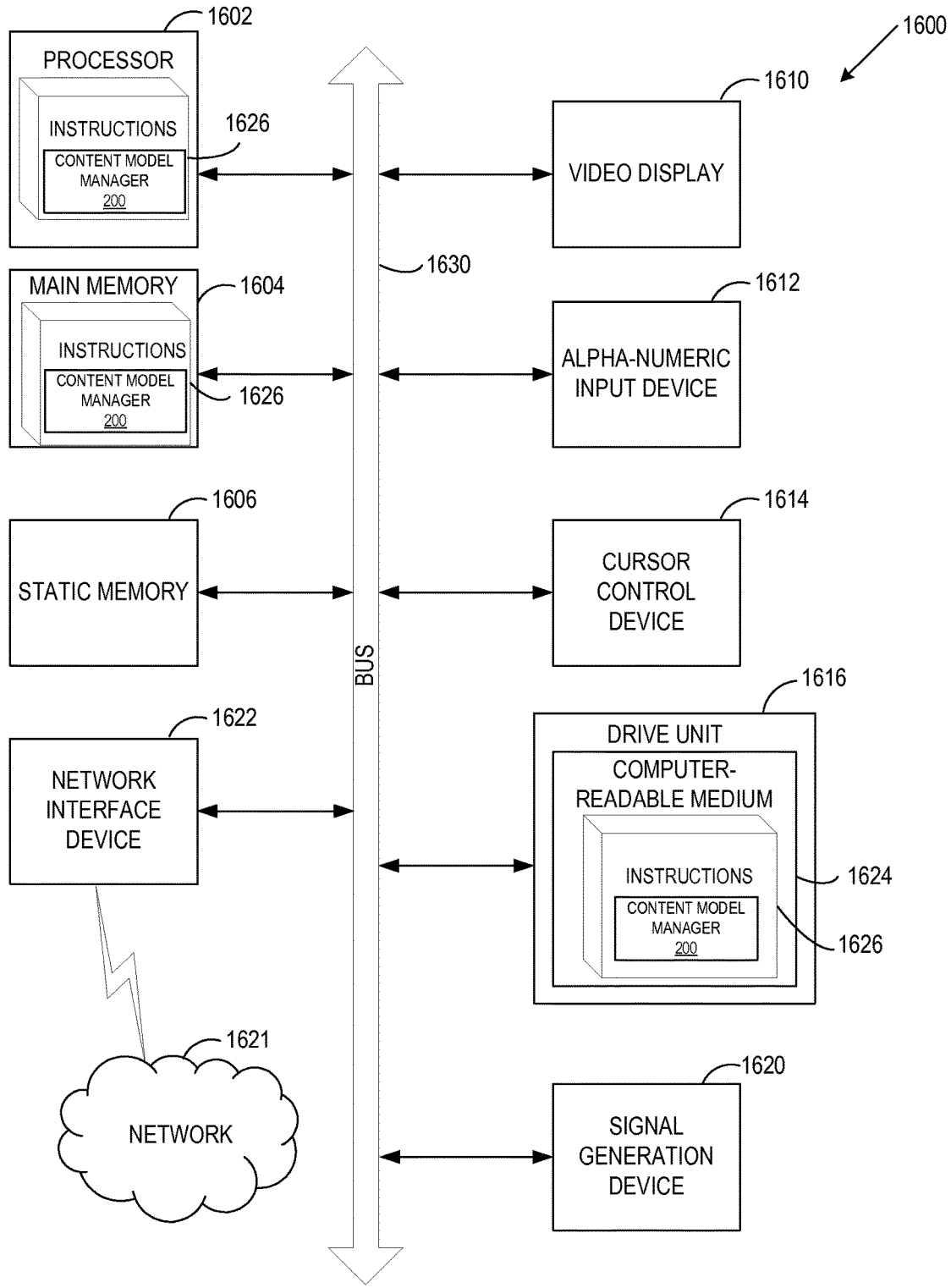
FIG. 16 illustrates a diagrammatic representation of a machine in the exemplary form of a computer system within which a set of instructions, for causing the machine to perform any one or more of the methodologies discussed herein, may be executed.

FIG. 16 illustrates a diagrammatic representation of a machine in the exemplary form of a computer system 1600 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1600 includes a processing device (processor) 1602, a main memory 1604 (e.g., read-only memory (ROM), flash memory, dynamic random access memory (DRAM) such as synchronous DRAM (SDRAM) or Rambus DRAM (RDRAM), etc.), a static memory 1606 (e.g., flash memory, static random access memory (SRAM), etc.), and a data storage device 1618, which communicate with each other via a bus 1608.

Processor 1602 represents one or more general-purpose processing devices such as a microprocessor, central processing unit, or the like. More particularly, the processor 1602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 1602 may also be one or more special-purpose processing devices such as an application specific integrated circuit (ASIC), a field programmable gate array (FPGA), a digital signal processor (DSP), network processor, or the like. The processor 1602 is configured to execute instructions 1626 for performing the operations and steps discussed herein.

The computer system 1600 may further include a network interface device 1622. The computer system 1600 also may include a video display unit 1610 (e.g., a liquid crystal display (LCD) or a cathode ray tube (CRT)), an alphanumeric input device 1612 (e.g., a keyboard), a cursor control device 1614 (e.g., a mouse), and a signal generation device 1620 (e.g., a speaker).

The data storage device 1618 may include a computer-readable storage medium 1624 on which is stored one or more sets of instructions 1626 (e.g., software) embodying any one or more of the methodologies or functions described herein. The instructions 1626 may also reside, completely or at least partially, within the main memory 1604 and/or within the processor 1602 during execution thereof by the computer system 1600, the main memory 1604 and the processor 1602 also constituting computer-readable storage media. The instructions 1626 may further be transmitted or received over a network 1674 via the network interface device 1622.

In one implementation, the instructions 1626 include instructions for a content model manager 200 and/or a software library containing methods that call a content model manager. While the computer-readable storage medium 1624 is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "selecting", "generating", "determining", "obtaining", "updating," "switching," "comparing" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or."

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

I claim:

1. A method for a server computing system, the method comprising:
   receiving, by the server computing system, a user request for digital content;
   selecting, by the server computing system, from a plurality of content prefetching models, a content prefetching model for prefetching a plurality of portions of the digital content, wherein each of the plurality of content prefetching models is generated based on prior history associated with the digital content, the prior history comprising a plurality of prefetch sequences recorded by a plurality of user devices with respect to the digital content, wherein the selecting of the content prefetching model from the plurality of content prefetching models is based on a comparison between access information of the plurality of portions of the digital content in individual prefetching models, wherein the comparison between the access information of the plurality of portions in each individual prefetching model is performed using a predetermined metric, and wherein the plurality of content prefetching models comprises two or more of a histogram model, an order of play model or a decision tree model for predicting a prefetch sequence for the digital content;
   generating, by a processing device of the server computing system, the prefetch sequence for the digital content based on the selected content prefetching model; and
   causing, by the server computing system, the plurality of portions to be obtained using the prefetch sequence.

2. The method of claim 1, wherein the access information comprises at least one of: a number of times each portion of the digital content has been viewed, or an order in which the portions of the digital content were played.

3. The method of claim 1, wherein selecting the content prefetching model for the digital content comprises:
   determining whether the histogram model comprises access information for a first portion of the plurality of portions that compares, using the predetermined metric, to access information for a second portion of the plurality of portions;
   responsive to determining that the histogram model comprises access information for a first portion of the plurality of portions that does not compare, using the predetermined metric, to access information for a second portion of the plurality of portions, selecting the histogram model as the content prefetching model;
   responsive to determining that the histogram model comprises access information for a first portion of the plurality of portions that compares, using the predetermined metric, to access information for a second portion of the plurality of portions, determining whether the order of play model comprises access information for a portion associated with an order value that compares, using the predetermined metric, to access information for another portion associated with the order value;

responsive to determining that the order of play model comprises access information for the portion associated with the order value that does not compare, using the predetermined metric, to access information for the another portion associated with the order value, selecting the order of play model as the content prefetching model; and responsive to determining that the order of play model comprises access information for the portion associated with the order value that compares, using the predetermined metric, to access information for the another portion associated with the order value, selecting the decision tree model as the content prefetching model.

4. The method of claim 1, further comprising:
determining whether a predefined event associated with the digital content has occurred; and
upon determining that the predefined event associated with the digital content has occurred, selecting another content prefetching model for prefetching the plurality of portions of the digital content.

5. The method of claim 4, wherein the predefined event associated with the digital content occurs when a predefined threshold associated with the digital content has occurred or when the content prefetching model is not effective for the digital content.

6. The method of claim 1, wherein the histogram model comprises a watch value for each portion of the plurality of portions, and
wherein generating the prefetch sequence for the digital content comprises:
comparing the plurality of watch values for the plurality of portions, and
selecting an order for the prefetch sequence based on the comparison of the plurality of watch values for the plurality of portions.

7. The method of claim 1, wherein the order of play model comprises an order value for each of the plurality of portions and a watch value associated with each of the plurality of portions, and
wherein generating the prefetch sequence for the digital content comprises;
comparing the plurality of order values for the plurality of portions,
for each order value of a first portion that matches an order value of a second portion:
comparing a watch value associated with the first portion with a watch value associated with the second portion,
if the watch value associated with the first portion compares to the watch value associated with the second portion, selecting the first portion, and
if the corresponding watch value for the first portion compares to the watch value associated with the second portion, selecting the second portion, and
including the selected portion at a position in the prefetch sequence that is equivalent to the order value for the selected portion.

8. A non-transitory computer readable storage medium having instructions that, when executed by a processing device, cause the processing device to perform operations comprising:
receiving, by the processing device, a user request for digital content;
selecting, by the processing device, from a plurality of content prefetching models, a content prefetching model for prefetching a plurality of portions of the digital content, wherein each of the plurality of content prefetching models is generated based on prior history associated with the digital content, the prior history comprising a plurality of prefetch sequences recorded by a plurality of user devices with respect to the digital content, wherein the selecting of the content prefetching model from the plurality of content prefetching models is based on a comparison between access information of the plurality of portions of the digital content in individual prefetching models, wherein the comparison between the access information of the plurality of portions in each individual prefetching model is performed using a predetermined metric, and wherein the plurality of content prefetching models comprises two or more of a histogram model, an order of play model or a decision tree model for predicting a prefetch sequence for the digital content;
generating, by the processing device, the prefetch sequence for the digital content based on the selected content prefetching model; and
causing, by the processing device, the plurality of portions to be obtained using the prefetch sequence.

9. The non-transitory computer readable storage medium of claim 8, wherein the access information comprises at least one of: a number of times each portion of the digital content has been viewed, or an order in which the portions of the digital content were played.

10. The non-transitory computer readable storage medium of claim 8, wherein to select the content prefetching model for the digital content, the instructions, when executed by the processing device, cause the processing device to perform operations comprising:
determining whether the histogram model comprises access information for a first portion of the plurality of portions that compares, using the predetermined metric, to access information for a second portion of the plurality of portions;
when the histogram model comprises access information for a first portion of the plurality of portions that does not compare, using the predetermined metric, to access information for a second portion of the plurality of portions, selecting the histogram model as the content prefetching model;
when the histogram model comprises access information for a first portion of the plurality of portions that compares, using the predetermined metric, to access information for a second portion of the plurality of portions, determining whether the order of play model comprises access information for a portion associated with an order value that compares, using the predetermined metric, to access information for another portion associated with the order value;
when the order of play model comprises access information for the portion associated with the order value that does not compare, using the predetermined metric, to access information for the another portion associated with the order value, selecting the order of play model as the content prefetching model; and
when the order of play model comprises access information for the portion associated with the order value that compares, using the predetermined metric, to access information for the another portion associated with the order value, selecting the decision tree model as the content prefetching model.

11. The non-transitory computer readable storage medium of claim 8, wherein the instructions, when executed by the processing device, cause the processing device to perform operations further comprising:

determining whether a predefined event associated with the digital content has occurred; and upon determining that the predefined event associated with the digital content has occurred, selecting another content prefetching model for prefetching the plurality of portions of the digital content.

12. The non-transitory computer readable storage medium of claim 8,
wherein the histogram model comprises a watch value for each portion of the plurality of portions and wherein to generate prefetch the sequence for the digital content, the instructions, when executed by the processing device, cause the processing device to perform operations comprising:
comparing the plurality of watch values for the plurality of portions, and
selecting an order for the prefetch sequence based on the comparison of the plurality of watch values for the plurality of portions.

13. The non-transitory computer readable storage medium of claim 8, wherein the order of play model comprises an order value for each of the plurality of portions and a watch value associated with each of the plurality of portions, and wherein to generate the prefetch sequence for the digital content, the instructions, when executed by the processing device, cause the processing device to perform operations comprising:
comparing the plurality of order values for the plurality of portions,
for each order value of a first portion that matches an order value of a second portion,
comparing a watch value associated with the first portion with a watch value associated with the second portion,
if the watch value associated with the first portion compares to the watch value associated with the second portion, selecting the first portion, and if the watch value associated with the first portion compares to the watch value associated with the second portion, selecting the second portion, and
including the selected portion at a position in the prefetch sequence that is equivalent to the order value for the selected portion.

14. A computing device comprising:
a memory; and
a processing device coupled to the memory, wherein the processing device is configured to:
receive a user request for digital content;
select from a plurality of content prefetching models, a content prefetching model for prefetching a plurality of portions of the digital content, wherein each of the plurality of content prefetching models is generated based on prior history associated with the digital content, the prior history comprising a plurality of prefetch sequences recorded by a plurality of user devices with respect to the digital content, wherein the content prefetching model is selected from the plurality of content prefetching models is based on a comparison between access information of the plurality of portions of the digital content in individual prefetching models, wherein the comparison between the access information of the plurality of portions in each individual prefetching model is performed using a predetermined metric, and wherein the plurality of content prefetching models comprises two or more of a histogram model, an order of play model or a decision tree model for predicting a prefetch sequence for the digital content;
generate the prefetch sequence for the digital content based on the selected content prefetching model; and
cause the plurality of portions to be obtained using the prefetch sequence.

15. The computing device of claim 14, wherein the access information comprises at least one of: a number of times each portion of the digital content has been viewed, or an order in which the portions of the digital content were played.

16. The computing device of claim 14, wherein to select the content prefetching model for the digital content, the processing device is further configured to:
determine whether the histogram model comprises access information for a first portion of the plurality of portions that compares, using the predetermined metric, to access information for a second portion of the plurality of portions;
when the histogram model comprises access information for a first portion of the plurality of portions that does not compare, using the predetermined metric, to access information for a second portion of the plurality of portions, selecting the histogram model as the content prefetching model;
when the histogram model comprises access information for a first portion of the plurality of portions that compares, using the predetermined metric, to access information for a second portion of the plurality of portions, determining whether the order of play model comprises access information for a portion associated with an order value that compares, using the predetermined metric, to access information for another portion associated with the order value;
when the order of play model comprises access information for the portion associated with the order value that does not compare, using the predetermined metric, to access information for the another portion associated with the order value, selecting the order of play model as the content prefetching model; and
when the order of play model comprises access information for the portion associated with the order value that compares, using the predetermined metric, to access information for the another portion associated with the order value, selecting the decision tree model as the content prefetching model.

17. The computing device of claim 14, wherein the processing device is further configured to
determine whether a predefined event associated with the digital content has occurred; and
upon determining that the predefined event associated with the digital content has occurred, select another content prefetching model for prefetching the plurality of portions of the digital content.

18. The computing device of claim 14, wherein the histogram model comprises a watch value for each portion of the plurality of portions and wherein to generate the prefetch sequence for the digital content, the processing device is further configured to:
compare the plurality of watch values for the plurality of portions, and
select an order for the prefetch sequence based on the comparison of the plurality of watch values for the plurality of portions.

19. The computing device of claim 14, wherein the order of play model comprises an order value for each of the plurality of portions and a watch value associated with each of the plurality of portions, and wherein to generate the prefetch sequence for the digital content, the processing device is further configured to:
  compare the plurality of order values for the plurality of portions,
  for each order value of a first portion that matches an order value of a second portion:
    compare a watch value associated with the first portion with a watch value associated with the second portion,
    if the watch value associated with the first portion compares to the watch value associated with the second portion, select the first portion, and
    if the watch value associated with the first portion compares to the watch value associated with the second portion,
      select the second portion, and
      include the selected portion at a position in the prefetch sequence that is equivalent to the order value for the selected portion.

\* \* \* \* \*